United States Patent
Appalaraju et al.

(10) Patent No.: US 10,984,560 B1
(45) Date of Patent: Apr. 20, 2021

(54) COMPUTER VISION USING LEARNT LOSSY IMAGE COMPRESSION REPRESENTATIONS

(71) Applicant: Amazon Technologies, Inc., Seattle, WA (US)

(72) Inventors: Srikar Appalaraju, Seattle, WA (US); R. Manmatha, San Francisco, CA (US); Tal Hassner, Torrance, CA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 16/370,598

(22) Filed: Mar. 29, 2019

(51) Int. Cl.
*G06N 3/04* (2006.01)
*G06T 9/00* (2006.01)
*G06K 9/00* (2006.01)
*G06K 9/62* (2006.01)

(52) U.S. Cl.
CPC .......... *G06T 9/001* (2013.01); *G06K 9/00288* (2013.01); *G06K 9/00671* (2013.01); *G06K 9/6256* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,554,001 B2 * | 10/2013 | Lee | ...................... | H04N 19/176 382/233 |
| 8,699,801 B2 * | 4/2014 | Wallace | ......... | H04N 21/234327 382/232 |
| 10,311,324 B1 * | 6/2019 | Kim | ...................... | G06N 3/0454 |
| 10,623,775 B1 * | 4/2020 | Theis | ...................... | H04N 19/61 |
| 2007/0237222 A1 * | 10/2007 | Xia | ...................... | H04N 19/126 375/240.03 |
| 2010/0289971 A1 * | 11/2010 | Odland | ................... | A43B 3/24 348/801 |
| 2011/0038556 A1 * | 2/2011 | Mathe | .................... | H04N 19/61 382/245 |
| 2014/0105493 A1 * | 4/2014 | Wu | ......................... | H04N 19/88 382/166 |
| 2014/0355991 A1 * | 12/2014 | Cameirao | .............. | H04B 10/27 398/79 |
| 2015/0010068 A1 * | 1/2015 | Francois | ................ | H04N 19/88 375/240.08 |

(Continued)

*Primary Examiner* — Cindy Trandai
(74) *Attorney, Agent, or Firm* — Pierce Atwood LLP

(57) ABSTRACT

Techniques for performing learnt image compression and object detection using compressed image data are described. A system may perform image compression using an image compression model that includes an encoder, an entropy model, and a decoder. The encoder, the entropy model, and the decoder may be jointly trained using machine learning based on training data. After training, the encoder and the decoder may be separated to encode image data to generate compressed image data or to decode compressed image data to generate reconstructed image data. In addition, the system may perform object detection using a compressed object detection model that processes compressed image data generated by the image compression model. For example, the compressed object detection model may perform partial decoding using a single layer of the decoder and perform compressed object detection on the partially decoded image data.

20 Claims, 18 Drawing Sheets

(56) References Cited

U.S. PATENT DOCUMENTS

| | | | |
|---|---|---|---|
| 2015/0201196 A1* | 7/2015 | Cheong | H04N 19/146 |
| | | | 375/240.03 |
| 2016/0359815 A1* | 12/2016 | Gaushell | H04L 63/0428 |
| 2017/0070749 A1* | 3/2017 | Takami | H04N 19/593 |
| 2018/0137642 A1* | 5/2018 | Malisiewicz | G06K 9/00201 |
| 2018/0144215 A1* | 5/2018 | Shen | H04N 19/439 |
| 2019/0004534 A1* | 1/2019 | Huang | G05D 1/0088 |
| 2019/0149390 A1* | 5/2019 | Torbatian | H04B 10/541 |
| | | | 375/298 |
| 2019/0149828 A1* | 5/2019 | Jeong | H04N 19/105 |
| | | | 375/240.12 |
| 2019/0171908 A1* | 6/2019 | Salavon | G06N 3/084 |
| 2019/0172224 A1* | 6/2019 | Vajda | G06N 3/084 |
| 2019/0311227 A1* | 10/2019 | Kriegman | G06K 9/6273 |
| 2019/0349414 A1* | 11/2019 | Cuervo Laffaye | H04N 19/137 |
| 2020/0005511 A1* | 1/2020 | Kavidayal | G06N 3/088 |
| 2020/0012904 A1* | 1/2020 | Zhao | G06N 3/0454 |
| 2020/0027247 A1* | 1/2020 | Minnen | G06N 3/0454 |
| 2020/0092556 A1* | 3/2020 | Coelho | H04N 19/124 |
| 2020/0098144 A1* | 3/2020 | Norouzi | G06T 11/40 |
| 2020/0107023 A1* | 4/2020 | Lee | H04N 19/149 |
| 2020/0118121 A1* | 4/2020 | Narang | G06T 1/0021 |
| 2020/0143191 A1* | 5/2020 | Du | G06K 9/4604 |
| 2020/0143205 A1* | 5/2020 | Yao | G06K 9/6262 |
| 2020/0177761 A1* | 6/2020 | Mizuno | H04N 1/00822 |
| 2020/0193299 A1* | 6/2020 | Geva | G06K 9/6215 |
| 2020/0193609 A1* | 6/2020 | Dharur | G06N 3/084 |
| 2020/0202128 A1* | 6/2020 | Liu | H04N 5/232935 |
| 2020/0211229 A1* | 7/2020 | Hwang | G06T 3/4046 |
| 2020/0234051 A1* | 7/2020 | Lee | G06N 3/0445 |

\* cited by examiner

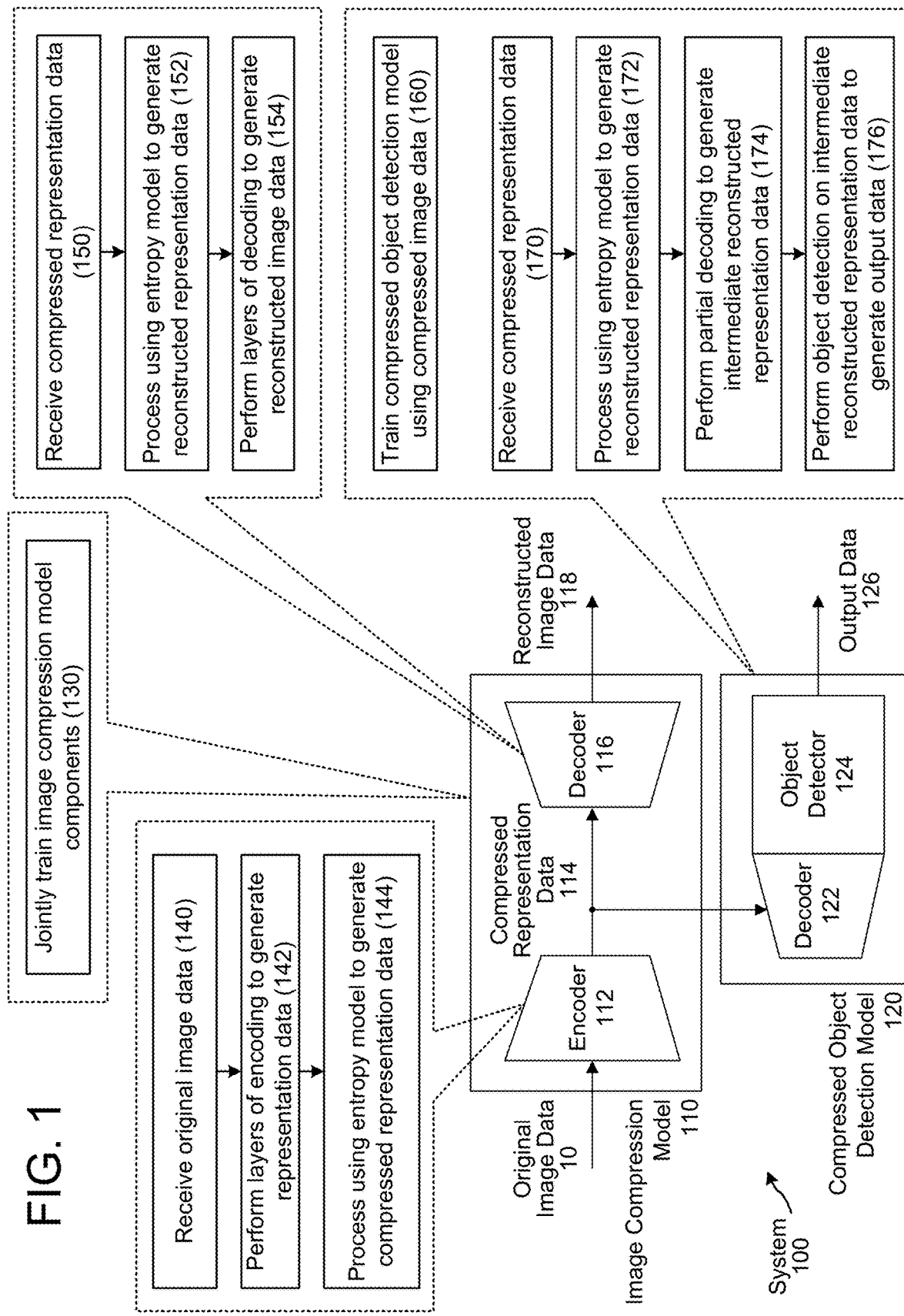

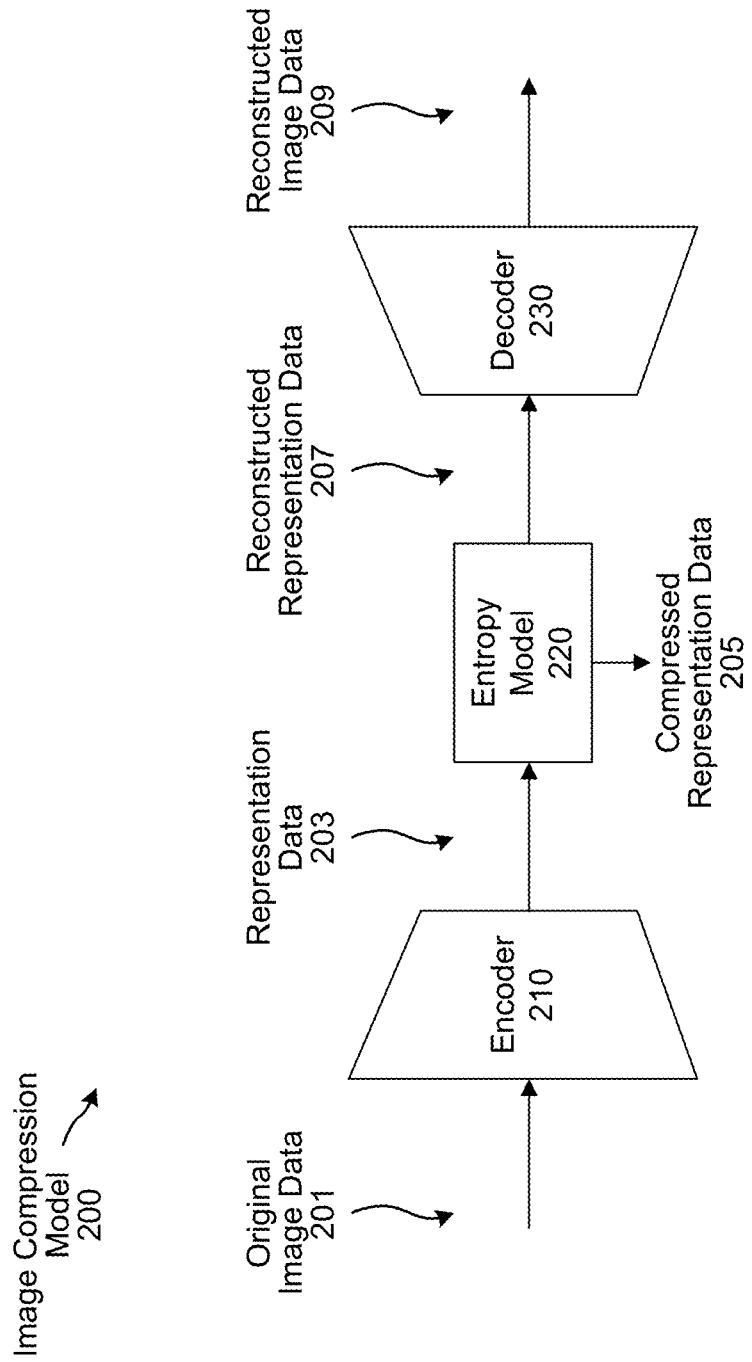

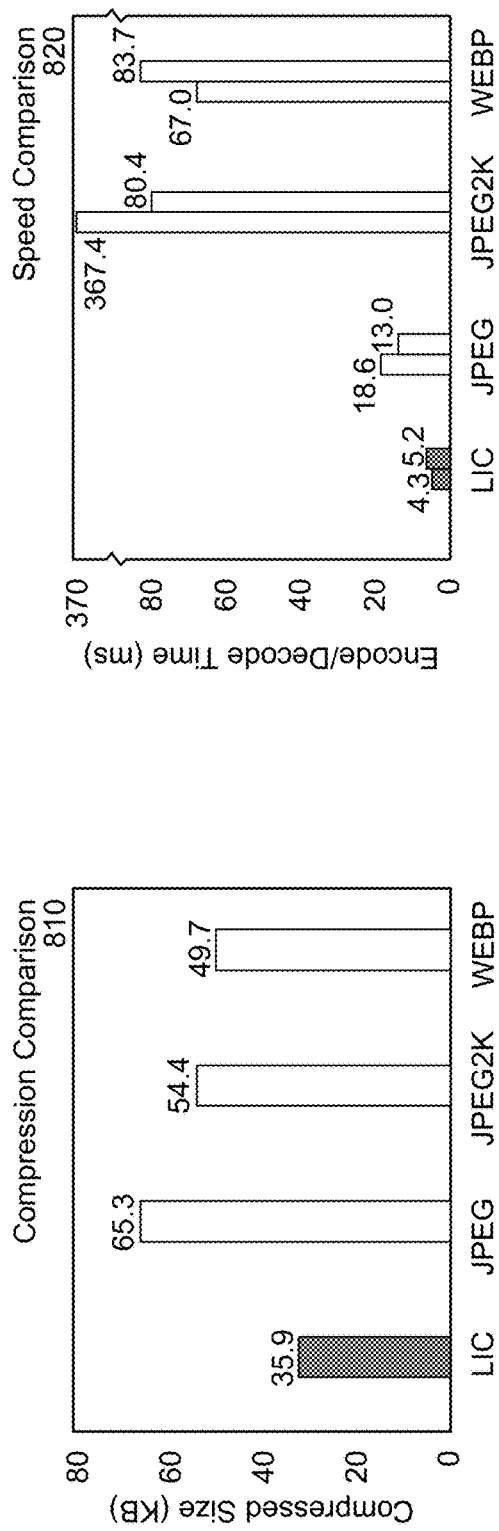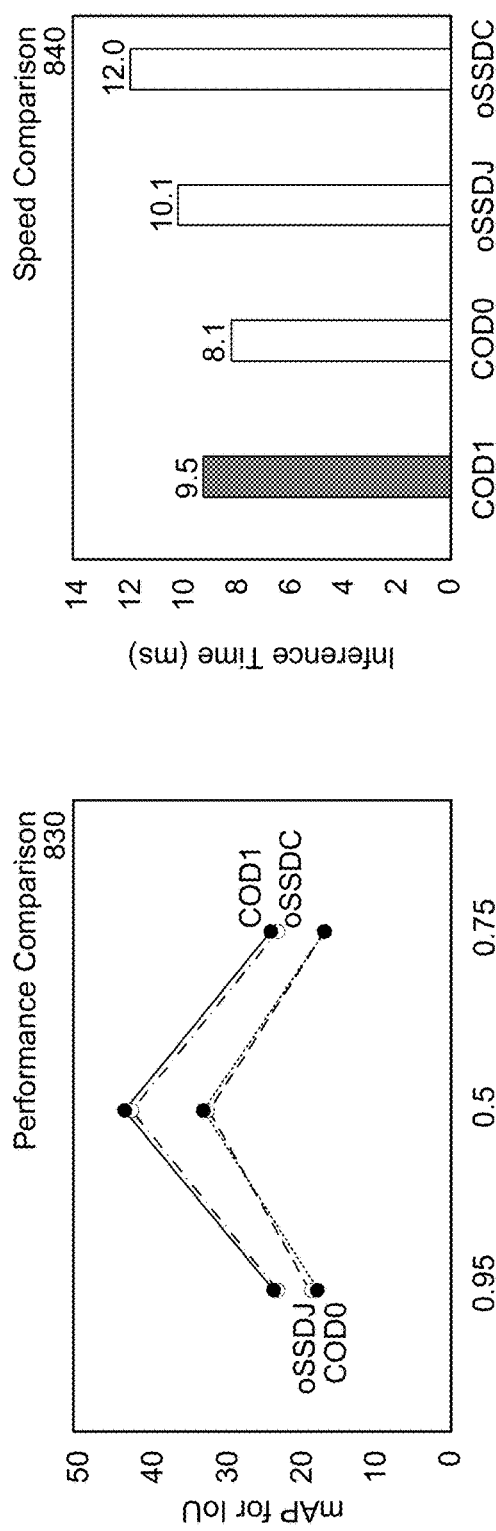
FIG. 8A
FIG. 8B

US 10,984,560 B1

COMPUTER VISION USING LEARNT LOSSY IMAGE COMPRESSION REPRESENTATIONS

BACKGROUND

With advancement of technology, the use and popularity of electronic devices has increased considerably. Electronic devices are commonly used to display image content.

BRIEF DESCRIPTION OF DRAWINGS

For a more complete understanding of the present disclosure, reference is now made to the following description taken in conjunction with the accompanying drawings.

FIG. 1 is a conceptual diagram of a system configured to perform image compression and to perform object detection on compressed representation data according to embodiments of the present disclosure.

FIG. 2 is a conceptual diagram of an image compression model according to embodiments of the present disclosure.

FIGS. 8A-8B illustrate comparison charts that illustrate performance improvements associated with the image compression model and the compressed object detection model according to embodiments of the present disclosure.

DETAILED DESCRIPTION

Figure 3A:
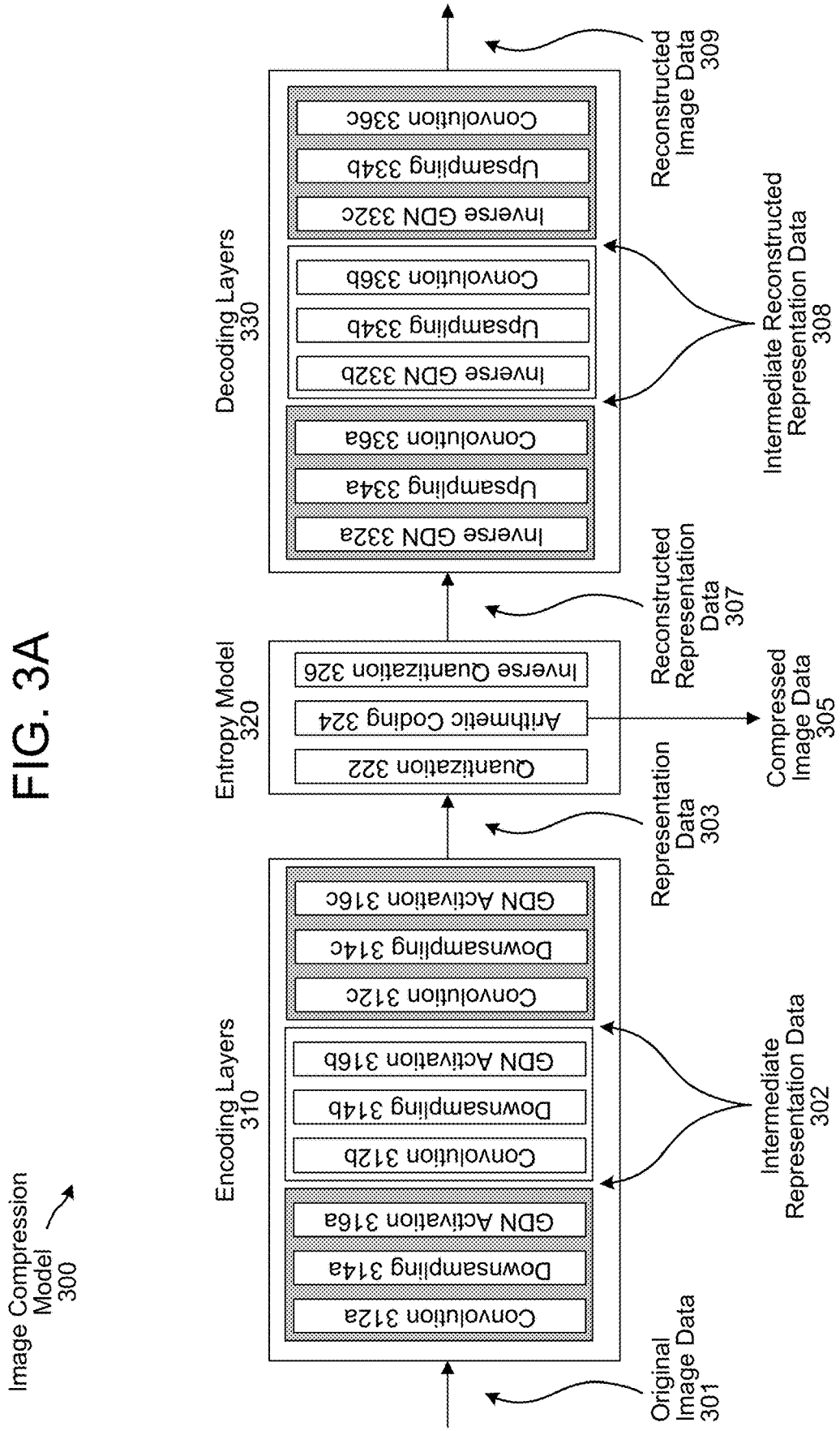
FIGS. 3A-3C are conceptual diagrams illustrating example components of the image compression model according to embodiments of the present disclosure.

Electronic devices are increasingly used to display and process content, such as images. As a quality of the content increases, a corresponding size of the content or bandwidth required to send and receive the content increases accordingly. Due to storage and transmission limitations, it is beneficial to reduce the size of the content or the bandwidth required to send/receive the content, which may be done by performing image compression. Joint Photographic Experts Group (JPEG) is one example of a commonly used method for image compression.

While performing image compression reduces the size of the content and/or the bandwidth required to send/receive the content, most state of the art computer vision algorithms (e.g., deep learning object detection models) require that the inputs be uncompressed images. Thus, input images stored in a compressed format (e.g., JPEG) have to be decoded to generate raw images before the computer vision algorithm can begin processing.

To decrease a size of the compressed image and decrease a processing time associated with compressing an image, devices, systems and methods are disclosed for performing image compression using an image compression model that is trained using machine learning. For example, the image compression model may include an encoder, an entropy model, and a decoder, which may be jointly trained to determine trainable parameters and/or determine a probability density (e.g., probability distribution) used in the entropy model. After training, the encoder and the decoder may be separately used to encode original image data to generate compressed image data (e.g., compressed representation data) or to decode compressed image data to generate reconstructed image data.

Additionally or alternatively, to improve a performance and/or decrease an inference runtime associated with performing object detection, devices, systems and methods are disclosed for performing object detection on compressed representation data using a compressed object detection model. For example, the compressed object detection may perform object detection using compressed representation data without first decoding the compressed representation data to generate raw image data. Thus, the compressed object detection model may perform partial decoding using a single layer of decoding and perform object detection on the partially decoded representation data, resulting in reduced storage and processing consumption and faster processing than existing techniques.

FIG. 1 illustrates a system configured to perform learned image compression and/or compressed object detection. Although the figures and discussion of the present disclosure illustrate certain operational steps of the system in a particular order, the steps described may be performed in a different order (as well as certain steps removed or added) without departing from the intent of the disclosure.

As used herein, learnt image compression refers to an image compression model that is trained using machine learning without human intervention. Similarly, compressed object detection refers to performing object detection on compressed image data (e.g., compressed representation data). However, compressed object detection does not correspond to detecting a compressed object; an image represented in the compressed image data and/or an object represented in the image is not compressed. As illustrated in FIG. 1, a system 100 may include an image compression model 110 and/or a compressed object detection model 120. For example, the image compression model 110 may include an encoder 112 and a decoder 116. As will be described in greater detail below, both the encoder 112 and the decoder 116 may include portions of an entropy model that is configured to perform entropy encoding and/or entropy decoding.

The image compression model 110 may be configured to receive original image data 10 and generate compressed representation data 114 using the encoder 112. For example, the encoder 112 may reduce a resolution of the original image data 10 and perform compression to reduce a number of bits (e.g., size) associated with the compressed representation data 114 relative to original image data 10. Due to the lower resolution, the reduced number of bits, and/or the compression, the compressed representation data 114 may have a lower bandwidth and/or processing consumption relative to the original image data 10.

In addition to generating the compressed representation data 114, the image compression model 110 may be configured to receive compressed representation data 114 and generate reconstructed image data 118 using the decoder 116. For example, the decoder 116 may increase a resolution of the compressed representation data 114 and increase a number of bits associated with the reconstructed image data 118 relative to the compressed representation data 114. As the image compression model 110 performs lossy compression, the reconstructed image data 118 can only approximate the original image data 10. However, as described below with regard to FIG. 8B, an image quality associated with the reconstructed image data 118 is higher than competing image compression techniques.

Image data may represent an image, a plurality of images (e.g., sequence of images and/or the like), video, and/or the like. The image compression model 110 is configured to compress image data that represents one or more images, which may correspond to some video protocols (e.g., motion JPEG), but other video protocols may not be compatible with the image compression model 110.

As used herein, image data may correspond to data that represents an image, such as raw image data, compressed image data, and/or the like. For example, raw image data stores pixel information using three separate channels (e.g., Red/Green/Blue (RGB)), and each pixel may be directly mapped to a corresponding pixel in an image represented by the raw image data. In contrast, compressed image data may store pixel information using any number of channels, may have a lower resolution than the raw image data, and in some examples may not directly map to the image represented by the compressed image data. For example, compressed image data may need to be decoded in order to generate raw image data that includes pixel information corresponding to the pixels of an image represented in the compressed image data.

To distinguish the compressed image data generated by the image compression model 110 from other compressed image data generated using conventional techniques known to one of skill in the art, the disclosure refers to compressed image data generated by the image compression model 110 as representation data. For example, the representation data may correspond to an intermediate representation of an image, such that the image is embedded in a space in which it can be compressed. Thus, the representation data may not correspond to pixel information that maps to the image represented in the representation data, but the system 100 may decode the representation data to generate reconstructed image data 118 that is similar to the original image data 10.

As used herein, a channel corresponds to information associated with a portion of an image, with each channel having identical dimensions (e.g., same number of pixels). For example, raw image data may be stored using an RGB format, which includes three separate channels, with each channel including information corresponding to one of the primary colors. Thus, the three channels may be processed separately but can be combined to represent the image. However, channels are not limited to dimensions of the image represented in the representation data, and the representation data may have any number of channels without departing from the disclosure. For example, representation data may have 128 channels corresponding to fixed dimensions (e.g., 19 pixels by 19 pixels), although the disclosure is not limited thereto. Thus, representation data may include a plurality of channels, with each channel having identical dimensions and storing information associated with a portion of an image represented in the representation data.

The compressed object detection model 120 may be configured to receive the compressed representation data 114 and perform object detection on the compressed representation data 114 and/or a partially reconstructed version of the compressed representation data 114. For example, the compressed object detection model 120 may include a decoder 122 that may process the compressed representation data 114 to generate partially decoded representation data, along with an object detector 124 that performs object detection on the partially decoded representation data to generate output data 126, as described in greater detail below with regard to FIGS. 6-7.

While not illustrated in FIG. 1, the image compression model 110 and/or the compressed object detection model 120 may be included in a device 102 or multiple devices 102 without departing from the disclosure. For example, a single device 102 may include the image compression model 110 and the compressed object detection model 120 and may perform compressed object detection 120 on compressed representation data 114 generated by the image compression model 110. However, the disclosure is not limited thereto, and in other examples a first device 102*a* may include the encoder 112, may generate compressed representation data 114 using the encoder 112, and may send the compressed representation data 114 to a second device 102*b* that includes the decoder 116. Thus, the second device 102*b* may receive the compressed representation data 114 and process the compressed representation data 114 using the decoder 116 to generate the reconstructed image data 118.

As illustrated in FIG. 1, the system 100 may jointly train (130) image compression model components, as described below with regard to FIG. 5. For example, the system 100 may train the image compression model components (e.g., encoder 112, decoder 116, and entropy model having portions included in the encoder 112 and/or the decoder 116) using machine learning (e.g., without human intervention). Thus, the image compression model 110 may be trained to perform image compression using training data.

After the image compression model 110 converges during training, the system 100 may freeze the compression model layers and the encoder 112 and the decoder 116 may be used independent from each other. For example, the encoder 112 may be separated from the decoder 116 without departing from the disclosure. Thus a first image compression model 110*a* may include the encoder 112 and be configured to perform encoding to generate compressed representation data, while a second image compression model 110*b* may include the decoder 116 and be configured to perform decoding to generate the reconstructed image data 118. However, the disclosure is not limited thereto and the encoder 112 and the decoder 116 may remain part of the image compression model 110 without departing from the disclosure, such that the image compression model 110 may be configured to perform encoding and/or decoding without departing from the disclosure.

As illustrated in FIG. 1, the encoder 112 may receive (140) original image data 10, may perform (142) layers of encoding to generate representation data, and may process (144) the representation data using an entropy model to generate the compressed representation data 114, as described in greater detail below with regard to FIGS. 2-4C.

Similarly, the decoder 116 may receive (150) compressed representation data 114, may process (152) the compressed representation data using the entropy model to generate reconstructed representation data, and may perform (154) layers of decoding to generate reconstructed image data 118, as described in greater detail below with regard to FIGS. 2-4C.

In some examples, the system 100 may train (160) the compressed object detection model 120 using compressed representation data. For example, the compressed object detection model 120 may be trained using the compressed representation data 114 generated by the image compression model 110, although the disclosure is not limited thereto.

After training the compressed object detection model 120, the compressed object detection model 120 may receive (170) compressed representation data, may process (172) the compressed representation data using the entropy model to generate reconstructed representation data, may perform (174) partial decoding on the reconstructed representation data to generate partially reconstructed representation data, and may perform (176) object detection on the partially reconstructed representation data to generate output data 126. For example, the output data 126 may include classification loss and/or bounding box loss, although the disclosure is not limited thereto. A detailed description of the compressed object detection model 120 is provided below with regard to FIGS. 6A-7.

FIG. 2 is a conceptual diagram of an image compression model according to embodiments of the present disclosure. As illustrated in FIG. 2, an image compression model 200 includes an encoder 210, an entropy model 220, and a decoder 230. While FIG. 2 illustrates the entropy model 220 as a separate component, a first portion of the entropy model 220 may be included in the encoder 210 and a second portion of the entropy model 220 may be included in the decoder 230.

As illustrated in FIG. 2, the encoder 210 may receive original image data 201 and may generate representation data 203. For example, the encoder 210 may include multiple layers that iteratively process the original image data 201 to reduce the resolution, as described in greater detail below with regard to FIGS. 3A-3B.

The entropy model 220 may receive the representation data 203 and may generate compressed representation data 205. For example, the entropy model 220 may perform quantization and entropy encoding to reduce a number of bits required to represent the representation data 203. As will be described in greater detail below with regard to FIG. 4B, quantization reduces a range of values to a fixed number of uniform bins. For example, quantization may reduce from 256+ values to only 16 values. The fixed number of uniform bins (e.g., 16 discrete values) correspond to symbols (e.g., characters) that are represented using a fixed number of bits per symbol (e.g., 4 bits per symbol). Entropy encoding compresses the data further by encoding the symbols using a variable number of bits per symbol, such that frequently used symbols are stored with fewer bits and less frequently used symbols are stored with more bits, resulting in fewer bits used overall. As described in greater detail below, a portion of the entropy model 220 that performs the quantization and entropy encoding may be included as part of an encoder.

To decode the compressed representation data 205, the entropy model 220 may process the compressed representation data 205 to generate reconstructed representation data 207. For example, the entropy model 220 may perform entropy decoding and inverse quantization to approximate the original range of values (e.g., 256+ values) using the fixed number of bits per symbol. To illustrate an example, the compressed representation data 205 may be decoded using entropy decoding to represent the data using the fixed number of bits per symbol, and then inverse quantization may be performed to approximate the original range of values (e.g., convert from the fixed number of uniform bins back to the original range of values). As described in greater detail below, a portion of the entropy model 220 that performs the entropy decoding and inverse quantization may be included as part of a decoder.

The decoder 230 may receive the reconstructed representation data 207 and may generate reconstructed image data 209. For example, the decoder 230 may include multiple layers that iteratively process the reconstructed representation data 207 to increase the resolution, as described in greater detail below with regard to FIGS. 3A-3C.

Using the image compression model 200, the system 100 may conserve storage space and/or bandwidth by generating the compressed representation data 205. For example, as the compressed representation data 205 has a lower resolution and fewer bits than the original image data 201, storing the compressed representation data 205 instead of the original image data 201 requires less storage space, sending the compressed representation data 205 instead of the original image data 201 consumes less bandwidth, and processing the compressed representation data 205 instead of the original image data 201 requires less computational power.

Figure 3B:
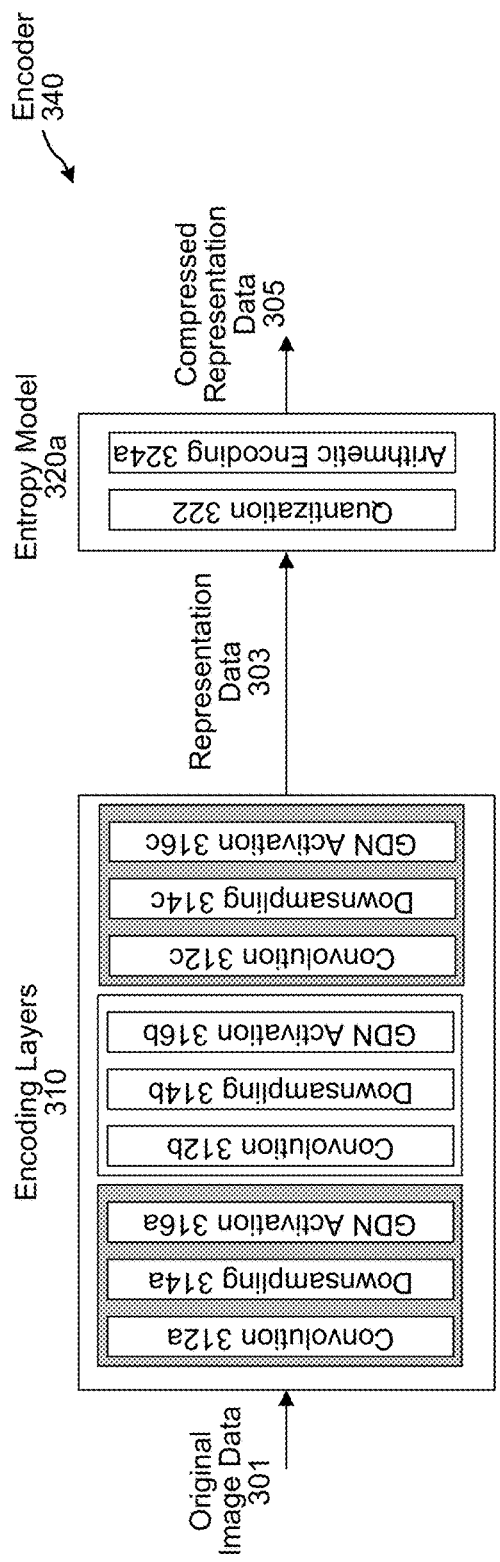
Figure 3C:
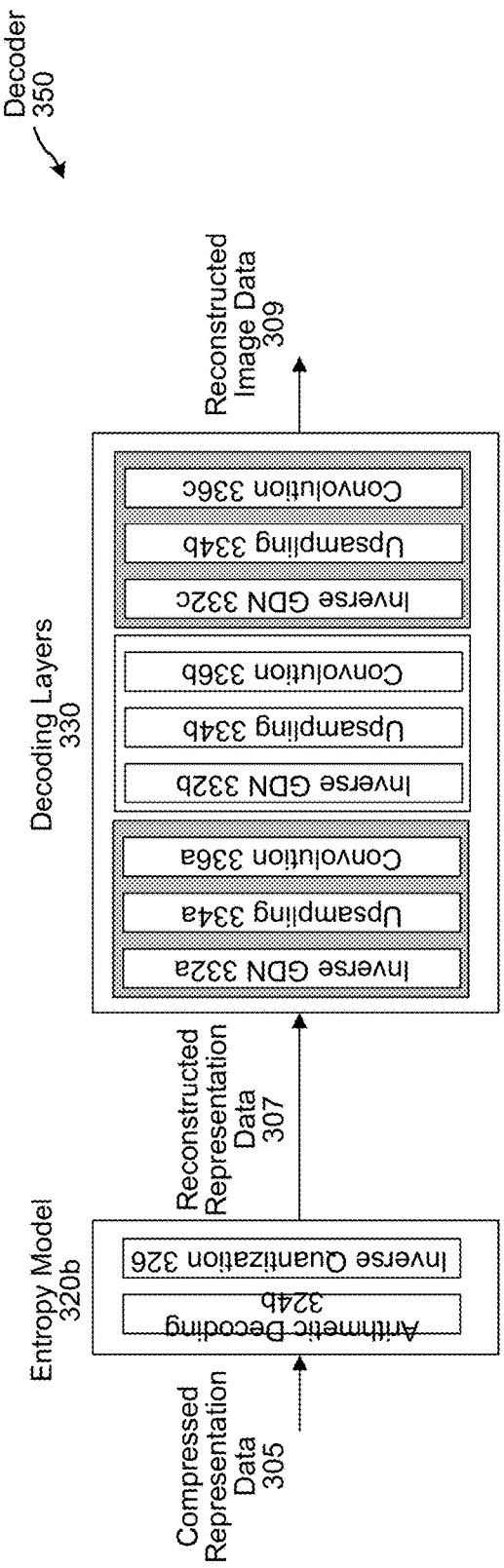

FIGS. 3A-3C are conceptual diagrams illustrating example components of the image compression model according to embodiments of the present disclosure. As illustrated in FIG. 3A, an image compression model 300 includes encoding layers 310, an entropy model 320, and decoding layers 330. While FIG. 3A illustrates the entropy model 320 separately from the encoding layers 310 and the decoding layers 330, FIG. 3B illustrates an example of an encoder 340, which includes the encoding layers 310 and a first portion of the entropy model 320a, while FIG. 3C illustrates an example of a decoder 350, which includes a second portion of the entropy model 320b and the decoding layers 330.

As illustrated in FIG. 3A, the encoding layers 310 may receive original image data 301 and may generate representation data 303. For example, the encoding layers 310 may comprise multiple layers that iteratively process the original image data 201 to generate representation data 303 with reduced resolution. As illustrated in FIG. 3A, the encoding layers 310 may include three separate layers, with each layer performing convolution 312, downsampling 314, and generalized divisive normalization (GDN) activation 316. For example, a first encoding layer 310a may generate first intermediate representation data 302a, a second encoding layer 310b may generate second intermediate representation data 302b, and a third encoding layer 310c may generate the representation data 303.

The convolution 312 process performs a convolution to (e.g., convolves) input data with a kernel to generate output data. For example, the kernel may be a grid (e.g., 3×3, 5×5, 9×9, etc.) that indicates input pixels and/or weight values used to generate an individual output pixel value in the output data. To perform the convolution, the system 100 iteratively applies the kernel to the input data and calculates a weighted sum for each output pixel value. To illustrate an example using a 3×3 kernel, the convolution 312 may replace an original pixel value of a first pixel with an output pixel value determined using pixel values of neighboring pixels included in s 3×3 grid centered on the first pixel. Thus, the convolution 312 process effectively filters or smooths the representation data prior to downsampling. In some examples, the system 100 may apply padding, as known in the art, such that the output data has the same resolution as the input data. However, the disclosure is not limited thereto and the system 100 may perform convolution using any technique known to one of skill in the art.

When input data includes only a single input channel, the convolution 312 process may generate a single output channel. However, when input data includes multiple input channels, the convolution 312 process may be performed separately on each input channel. For example, RGB image data may have three input channels (e.g., Red (R), Green (G), and Blue (B)) and the convolution 312 process may be performed on each input channel to generate three output channels. In some examples, the three output channels may be combined to generate a single output channel, such that a first layer of the encoding layers 310 may compress the original image data 301 by reducing to one channel. However, the disclosure is not limited thereto and the system 100 may process the three input channels separately without departing from the disclosure.

The downsampling 314 process downsamples input data to generate output data having a lower resolution. For example, downsampling by two (e.g., 2× downsampling) cuts the height and width in half, such that input data having a first resolution (w×h) is processed to generate output data having a second resolution (w/2×h/2). Similarly, downsampling by four (e.g., 4× downsampling) cuts the height and width in quarter, such that input data having the first resolution (w×h) is processed to generate output data having a third resolution (w/4×h/4). The system 100 may perform downsampling using any technique known to one of skill in the art without departing from the disclosure, including averaging or maxpooling. For example, 2× downsampling may be performed by replacing a 2×2 grid of input pixel values with a single output pixel value generated by averaging the four input pixel values (e.g., averaging), by selecting a highest value of the four input pixel values (e.g., maxpooling), and/or the like. Additionally or alternatively, the system 100 may perform downsampling by performing convolution with a stride of two, as known to one of skill in the art, without departing from the disclosure.

The GDN activation 316 process applies normalization to (e.g., normalizes) input data to generate output data having normalized pixel values. In some examples, normalization recalculates pixel values based on a common scale, such as rescaling the inputs to a fixed mean/variance scheme (e.g., mean=0, variance=1), although the disclosure is not limited thereto. By rescaling to a common scale, normalization may increase contrast and distinguish local maxima (e.g., high values surrounded by lower values) from uniformly large values (e.g., high values surrounded by high values).

The GDN activation 316 is essentially a multivariate generalization of a sigmoid-type function:

$$y[i] = \frac{x[i]}{\sqrt{\beta[i] + sum_j(\gamma[j, i] * x[j])}} \quad [1]$$

where i represents a selected kernel, j represents other kernel(s), y[i] is output data for kernel i, x[i] is input data for kernel i, x[j] is input data for kernel j, β[i] is a "mean" parameter of kernel i, γ[j,i] is a "standard deviation" parameter, β (beta) and γ (gamma) are trainable parameters, and i and j run across channels (e.g., for a single pixel, the system 100 normalizes values of every channel according to values of all channels for the same pixel). Note that this normalization is applied individually to each pixel (e.g., position x, y in the data).

GDN activation 316 is similar to other methods of normalization (e.g., local response normalization, rectified linear unit (Relu) activation, etc.), but because β and γ are trainable parameters, it is more flexible. In addition, because it does not sum across spatial dimensions, one of the benefits of GDN activation is that it preserves spatial information, thereby better preserving pixel densities in an image. However, while FIG. 3A illustrates that the system 100 performs GDN activation, this is intended for illustrative purposes only and the disclosure is not limited thereto. Instead, the system 100 may apply normalization and/or regularization using other techniques known to one of skill in the art without departing from the disclosure.

FIG. 3A illustrates an example of three encoding layers 310, which may be referred to as first encoding layer 310a, second encoding layer 310b, and third encoding layer 310c. As illustrated in FIG. 3A, each of the encoding layers 310 may perform convolution 312, downsampling 314, and GDN activation 316. However, each of the encoding layers 310 may perform these steps using different parameters without departing from the disclosure. For example, the first encoding layer 310a may perform first downsampling 314a, which may downsample by four (e.g., 4× downsampling), the second encoding layer 310b may perform second downsampling 314b, which may downsample by two (e.g., 2× downsampling), and the third encoding layer 310c may perform third downsampling 314c, which may downsample by two (e.g., 2× downsampling). Thus, the cumulative processing of the encoding layers 310 reduces the dimensions of the representation data 303 by sixteen relative to the original image data 301 (e.g., 16× downsampling), but the first encoding layer 310a may process the representation data differently than the second encoding layer 310b and the third encoding layer 310c.

Similarly, the first encoding layer 310a may perform a first convolution 312a using a first kernel having a first size (e.g., 9×9 grid), whereas the second encoding layer 310b may perform second convolution 312b using a second kernel having a second size (e.g., 5×5 grid). The third encoding layer 310c may perform third convolution 312c using the second kernel, although the disclosure is not limited thereto.

The entropy model 320 may receive the representation data 303 and may generate compressed representation data 305. For example, the entropy model 320 may perform quantization 322 and arithmetic coding 324 (e.g., entropy encoding) to reduce a number of bits required to represent the representation data 303. As will be described in greater detail below with regard to FIG. 4B, performing quantization 322 reduces a range of values to a fixed number of uniform bins. For example, performing quantization 322 may reduce a range of pixel values from 256+ values to only 16 values. The fixed number of uniform bins (e.g., 16 values) correspond to symbols (e.g., characters) that are represented using a fixed number of bits per symbol (e.g., 4 bits per symbol). The arithmetic coding 324 may perform entropy encoding to compress the data further by encoding the symbols using a variable number of bits per symbol, such that frequently used symbols are stored with fewer bits and less frequently used symbols are stored with more bits, resulting in fewer bits used overall. As illustrated in FIG. 3B, a first portion of the entropy model 320a (e.g., quantization 322 and a first portion of the arithmetic coding 324a) may be included as part of an encoder 340.

To decode the compressed representation data 305, the entropy model 320 may process the compressed representation data 305 to generate reconstructed representation data 307. For example, the entropy model 320 may perform arithmetic coding 324 (e.g., entropy decoding) and inverse quantization 326 to approximate the original range of pixel values (e.g., increase the range of pixel values from 16 values to 256+ values) using the fixed number of bits per symbol. To illustrate an example, the compressed representation data 305 may be decoded using entropy decoding to represent the data using the fixed number of bits per symbol, and then inverse quantization 326 may be performed to approximate the original range of values (e.g., convert from the fixed number of uniform bins back to the original range of values). As illustrated in FIG. 3C, a second portion of the entropy model 320b (e.g., second portion of the arithmetic coding 324b and inverse quantization 326) may be included as part of a decoder 350.

As illustrated in FIG. 3A, the decoding layers 330 may receive the reconstructed representation data 307 and may generate reconstructed image data 309. For example, the decoding layers 330 may comprise multiple layers that iteratively process the reconstructed representation data 307 to generate the reconstructed image data 309 with increased resolution relative to the reconstructed representation data 307. In some examples, the reconstructed image data 309 may have the same resolution as the original image data 301, although the disclosure is not limited thereto. As illustrated in FIG. 3A, the decoding layers 330 may include three separate layers, with each layer performing inverse GDN activation 332, upsampling 334, and convolution 336. For example, a first decoding layer 330a may generate first intermediate reconstructed representation data 308a, a second decoding layer 330b may generate second intermediate reconstructed representation data 308b, and a third decoding layer 330c may generate the reconstructed image data 309.

The inverse GDN activation 332 process reverses the normalization performed by the GDN activation 316 to reconstruct the image. For example, the inverse GDN activation 332 performs denormalization to rescale input data to generate output data having unbounded pixel values. This may reduce contrast by reducing the visibility of local maxima (e.g., high values surrounded by lower values) relative to uniformly large values (e.g., high values surrounded by high values). As a result, inverse GDN activation 332 may improve image quality, as the reconstructed output pixel values are better approximations of (e.g., more similar to) the original pixel values prior to encoding.

The inverse GDN activation 332 is similar to the GDN activation 316, which is represented in equation [1] as a multivariate generalization of a sigmoid-type function, except that the division is replaced by multiplication as shown below:

$$y[i]=x[i]\sqrt{\beta[i]+\text{sum}_j(\gamma[j,i]*x[j])} \qquad [2]$$

where i represents a selected kernel, j represents other kernel(s), y[i] is output data for kernel i, x[i] is input data for kernel i, x[j] is input data for kernel j, β[i] is a "mean" parameter of kernel i, γ[j,i] is a "standard deviation" parameter, β (beta) and γ (gamma) are trainable parameters, and i and j run across channels (e.g., for a single pixel, the system 100 denormalizes values of every channel according to values of all channels for the same pixel). Note that equation [2] is applied individually to each pixel (e.g., position x, y in the data).

The upsampling 334 process upsamples input data to generate output data having a higher resolution. For example, upsampling by two (e.g., 2× upsampling) doubles the height and width, such that input data having a first resolution (w×h) is processed to generate output data having a second resolution (2 w×2 h). Similarly, upsampling by four (e.g., 4× upsampling) quadruples the height and width, such that input data having the first resolution (w×h) is processed to generate output data having a third resolution (4 w×4 h). The system 100 may perform upsampling using any technique known to one of skill in the art without departing from the disclosure, including interpolation (e.g., bilinear interpolation, bicubic interpolation, etc.), transposed convolution, and/or the like. In some examples, the upsampling 334 process may perform "unpooling," which reverts maxpooling by remembering the location of the maxima in the maxpooling layers. For example, if the downsampling 314 process performed maxpooling using a 2×2 grid, the upsampling 334 process may copy an input pixel value to a specific location in the 2×2 grid in the output data.

The convolution 336 process used in the decoding layers 330 is similar to the convolution 312 process used in the encoding layers 310. Thus, the convolution 336 process performs a convolution to (e.g., convolves) input data using a kernel to generate output data. For example, the kernel may be a grid (e.g., 3×3, 5×5, 9×9, etc.) that indicates input pixels and/or weight values used to generate an individual output pixel value in the output data. To perform the convolution, the system 100 iteratively applies the kernel to the input data and calculates a weighted sum for each output pixel value. To illustrate an example using a 3×3 kernel, the convolution 336 may replace an original pixel value of a first pixel with an output pixel value determined using pixel values of neighboring pixels included in a 3×3 grid centered on the first pixel. Thus, the convolution 336 process effectively filters or smooths the data after upsampling. In some examples, the system 100 may apply padding, as known in the art, such that the output data has the same resolution as the input data. However, the disclosure is not limited thereto and the system 100 may perform convolution using any technique known to one of skill in the art.

When input data includes multiple input channels, the convolution 336 process may be performed separately on each input channel. For example, RGB image data may have three input channels (e.g., Red (R), Green (G), and Blue (B)) and the convolution 336 process may be performed on each input channel to generate three output channels. Similarly, when input data includes only a single input channel, the convolution 336 process may generate a single output channel. However, the disclosure is not limited thereto and in some examples, the system 100 may process a single input channel to generate multiple output channels without departing from the disclosure. For example, the reconstructed representation data 307 may include a single channel whereas the reconstructed image data 309 may include three output channels without departing from the disclosure.

While the description of FIG. 3A is simplified for ease of illustration, the disclosure is not limited thereto. In some examples, performing encoding may increase a number of channels in the output data relative to the input data, while performing decoding may decrease a number of channels in the output data relative to the input data. For example, the original image data 301 may correspond to three input channels, while the representation data 303 may correspond to 128 output channels (e.g., 128 channels having 19×19 spatial dimensions), although the disclosure is not limited thereto. Thus, the encoding layers 310 may increase the number of channels without departing from the disclosure. Similarly, the decoding layers 330 may decrease the number of channels from 128 input channels in the reconstructed representation data 307 to three output channels in the reconstructed image data 309, although the disclosure is not limited thereto.

While FIG. 3A illustrates the entire image compression model 300, after the image compression model 300 is trained it can be split in half to form an encoder 340 and a decoder 350. As illustrated in FIG. 3B, the encoder 340 may include the encoding layers 310 and a first portion of the entropy model 320a (e.g., quantization 322 and a first portion of the arithmetic coding 324a). Thus, the encoder 340 may receive the original image data 301 and generate the compressed representation data 305. As illustrated in FIG. 3C, the decoder 350 may include a second portion of the entropy model 320b (e.g., second portion of the arithmetic coding 324b and inverse quantization 326) and the decoding layers 330. Thus, the decoder 350 may receive the compressed representation data 305 and may generate the reconstructed image data 309.

Figure 4A:
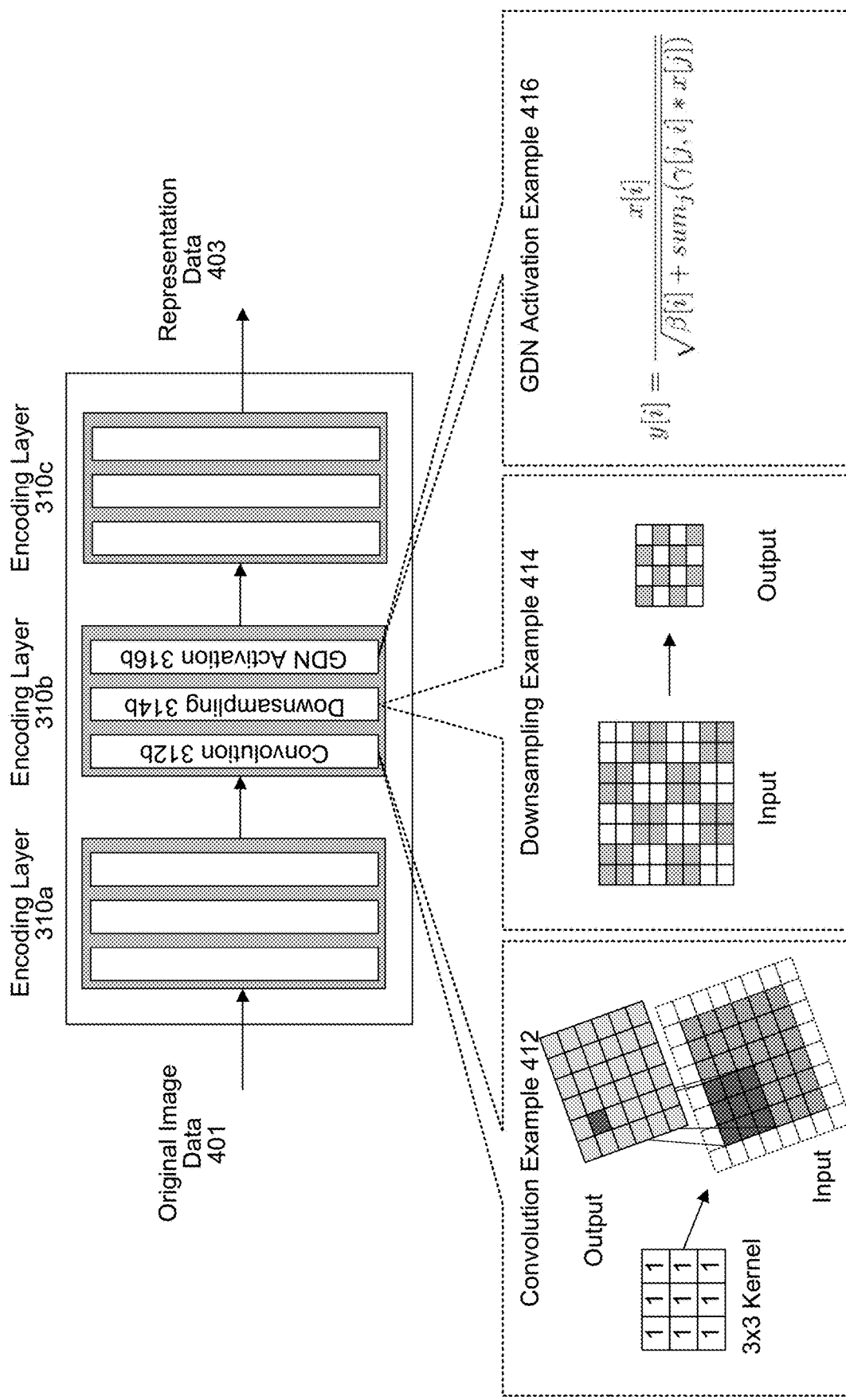
FIGS. 4A-4C illustrate examples of processing performed by the example components of the image compression model according to embodiments of the present disclosure.
Figure 4B:
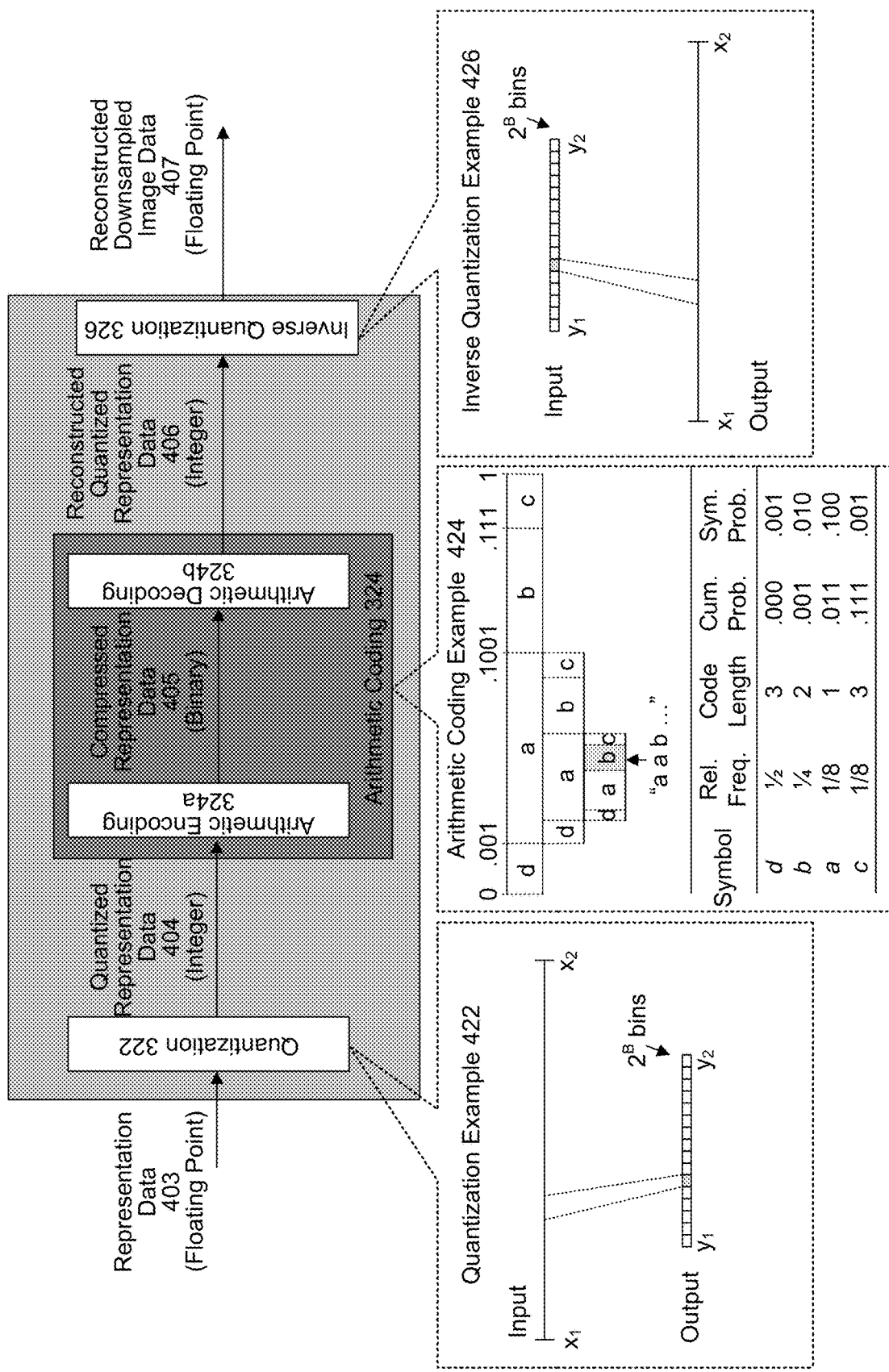
Figure 4C:
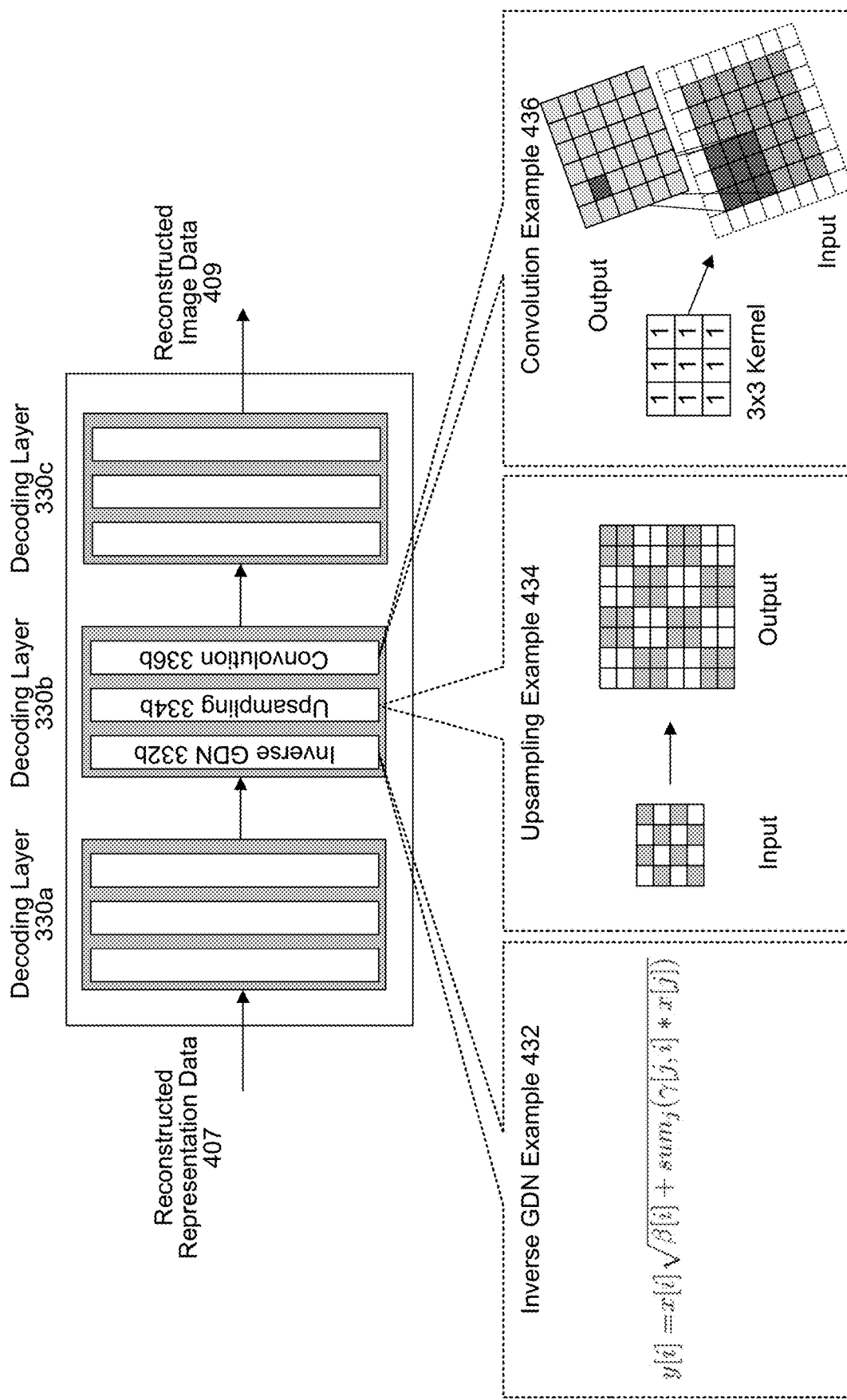

FIGS. 4A-4C illustrate examples of processing performed by the example components of the image compression model according to embodiments of the present disclosure. As illustrated in FIG. 4A, the encoding layers 310 may receive original image data 401 and may iteratively process the representation data to generate representation data 403. For example, FIG. 4A illustrates the encoding layers 310 as three separate layers, a first encoding layer 310a, a second encoding layer 310b, and a third encoding layer 310c. To illustrate the concepts involved in processing the representation data, FIG. 4A includes illustrative examples showing a simplified representation for the second encoding layer 310b. While these illustrative examples apply to each of the encoding layers 310, they are intended for illustrative purposes only and the system 100 may implement each step differently than the illustrative examples shown in FIG. 4A without departing from the disclosure.

As illustrated in FIG. 4A, the convolution 312b process may be visualized using convolution example 412, in which a 3×3 kernel with equal weights (e.g., value of 1 for each pixel in the kernel) is convolved with input data to generate output data. For example, the convolution example 412 illustrates how an output pixel value for a particular pixel is generated using input pixel values from a 3×3 grid of pixels. Specifically, the convolution example 412 illustrates that a first output pixel value for a first pixel having coordinates (2, 2) (e.g., $2^{nd}$ column from the left and $2^{nd}$ row from the top) is generated using first input pixel values from pixels included in the first three rows and first three columns (e.g., pixels having coordinates (1, 1), (2, 1), (3, 1), (1, 2), (2, 2), (3, 2), (1, 3), (2, 3), and (3, 3)).

While not illustrated in FIG. 4A, the system 100 would apply the kernel to each pixel in the input data, which can be visualized as the kernel sliding down the length of each row. For example, a second output pixel value for a second pixel having coordinates (3, 2) (e.g., $3^{nd}$ column from the left and $2^{nd}$ row from the top) is generated using second input pixel values for pixels included in rows 1-3 and columns 2-4 (e.g., pixels having coordinates (2, 1), (3, 1), (4, 1), (2, 2), (3, 2), (4, 2), (2, 3), (3, 3), and (4, 3)), a third output pixel value for a third pixel having coordinates (4, 2) (e.g., $4^{th}$ column from the left and $2^{nd}$ row from the top) is generated using third input pixel values for pixels included in rows 1-3 and columns 3-5 (e.g., pixels having coordinates (3, 1), (4, 1), (5, 1), (3, 2), (4, 2), (5, 2), (3, 3), (4, 3), and (5, 3)), and so on.

While the convolution example 412 illustrates performing padding convolution (e.g., output data has the same resolution as the input data), the disclosure is not limited thereto and the system 100 may perform convolution using any technique known to one of skill in the art. Similarly, while the convolution example 412 illustrates a 3×3 kernel, the disclosure is not limited thereto and the system 100 may use different kernel sizes (e.g., 5×5, 9×9, etc.) without departing from the disclosure. Finally, while the convolution example 412 illustrates the kernel using equal weighting, the disclosure is not limited thereto and the weighting may vary without departing from the disclosure.

As illustrated in FIG. 4A, the downsampling 314b process may be visualized using downsampling example 414, in which input data having first dimensions (e.g., 8×8) is downsampled to generate output data having second dimensions (e.g., 4×4). For example, the input data is separated into 2×2 squares, such that a single pixel in the output data corresponds to a single square (e.g., 4 pixels) in the input data. Specifically, this can be represented as a first output pixel value for a first pixel having coordinates (1, 1) in the output data being generated using first input pixel values for pixels included in a first square (e.g., top-left square including pixel coordinates (1, 1), (2, 1), (1, 2), and (2, 2)) in the input data. Similarly, a second output pixel value for a second pixel having coordinates (2, 1) in the output data is generated using second input pixel values for pixels included in a second square (e.g., including pixel coordinates (3, 1), (4, 1), (3, 2), and (4, 2)) in the input data, and so on.

As described above, the output data may be generated using maxpooling (e.g., selecting a highest pixel value from input pixel values in the 2×2 square), a weighted average (e.g., a weighted sum of the input pixels included in the 2×2 square), and/or the like. While the downsampling example 414 illustrates reducing the dimensions by two (e.g., 2× downsampling), the disclosure is not limited thereto and the system 100 may reduce the dimensions by four (e.g., 4× downsampling) and/or any other number without departing from the disclosure. Additionally or alternatively, the system 100 may perform downsampling by performing convolution with a stride of two, as known to one of skill in the art, without departing from the disclosure As illustrated in FIG. 4A, the GDN activation 316b process may be visualized using GDN activation example 416, in which input data is normalized using equation [1] described above to generate output data.

As illustrated in FIG. 4B, the entropy model 320 may receive the representation data 403 and may generate compressed representation data 405. For example, the entropy model 320 may perform quantization 322 and arithmetic encoding 324a to reduce a number of bits required to represent the representation data 403.

As illustrated in FIG. 4B, the entropy model 320 may perform quantization 322 to the representation data 403 to generate quantized representation data 404. To visualize this process, quantization example 422 illustrates a conceptual illustration of performing quantization to convert continuous values to a fixed number of uniform bins. For example, input data may correspond to floating point tensors having continuous values in a first range, which is represented as a continuous line between a first value (e.g., $x_1$) and a second value ($x_2$). The first range may correspond to 8-bit precision (e.g., 256 values), 16-bit precision (e.g., 65536 values), and/or the like without departing from the disclosure. In contrast, output data may correspond to integer values represented as discrete values in a second range between a first value (e.g., $y_1$) and a second value (e.g., $y_2$).

By performing quantization, the entropy model 320 separates the first range into a plurality of smaller segments, replacing all input pixel values within an individual segment with a single output pixel value. For example, a first group of input pixel values included in a first segment may be replaced by an output pixel value of "1," a second group of input pixel values included in a second segment may be replaced by an output pixel value of "2," and so on. Thus, performing quantization 322 converts the representation data 403, which represents floating point tensors, to the quantized representation data 404, which represents integer values for the discrete values.

As illustrated in FIG. 4B, the input data is quantized to B bit-precision, which is a hyper-parameter (e.g., preconfigured parameter that is not adapted during training) that indicates that the input data is quantized into $2^B$ equal sized bins (e.g., segments). For example, a 4 bit-precision (B=4) corresponds to 16 bins, 8 bit-precision (B=8) corresponds to 256 bins, etc.

A single pixel may be represented using three primary colors, red (R), green (G), and blue (B), and each primary color may be referred to as a color channel. Thus, RGB image data may have three channels, although the disclosure is not limited thereto. Each color channel may have a range of intensity values specified by the bit-precision or bit depth, and the bit depth for each primary color may be referred to as bits per channel. For example, RGB image data having 8-bits per channel represents 256 different intensity values for each primary color. In contrast, bits per pixel (bpp) refers to the sum of the bits in the three color channels and represents the total colors available at each pixel. Thus, RGB image data having 8-bits per channel corresponds to 24 bpp, which allows for $2^{8*3}$ (e.g., 16,777,216) different colors.

In some examples, the system 100 processes each of the channels separately, such that representation data 403, the quantized representation data 404, and the compressed representation data 405 comprise three separate channels that are quantized and encoded independently. Thus, while performing quantization 322 simplifies the quantized representation data 404 to include $2^B$ equal sized bins for each channel, 4-bits per channel (e.g., 16 uniform bins) corresponds to 12 bpp (e.g., 4096 colors). However, the disclosure is not limited thereto and in some examples the system 100 may combine multiple input channels to generate a single output channel. Thus, in this example, 4 bit-precision corresponds to 16 different colors, 8 bit-precision corresponds to 256 different colors, etc. As described above, the number of channels is not limited to three and the representation data 403 and the quantized representation data 404 may correspond to a plurality of channels without departing from the disclosure As described above, the quantized representation data 404 may represent the $2^B$ equal sized bins using integer values. As used herein, the integer values may be referred to as symbols (e.g., characters). Thus, 4 bit-precision may be represented using 16 unique symbols, 8 bit-precision may be represented using 256 unique symbols, etc. Similarly, each symbol may be represented in the quantized representation data 404 using fixed number of bits per integer. For example, if there are 16 unique symbols, each symbol may be represented using 4 bits per symbol, whereas if there are 256 unique symbols, each symbol may be represented using 8 bits per symbol.

To further compress the quantized representation data 404, the entropy model 320 may perform entropy coding to generate the compressed representation data 405 using a variable number of bits per symbol, such that frequently used symbols are stored with fewer bits and less frequently used symbols are stored with more bits, resulting in fewer bits used overall. For example, one of the main types of entropy coding creates and assigns a unique prefix-free code to each unique symbol that occurs in the input. Thus, the entropy model 320 may generate the compressed representation data 405 by replacing each fixed-length input symbol with the corresponding variable-length prefix-free output codeword. The length of each codeword is approximately proportional to the negative logarithm of the probability associated with the codeword. Therefore, the most common symbols use the shortest codes.

In some examples, the entropy model 320 may implement a specific form of entropy coding known as arithmetic coding. FIG. 4B illustrates an example in which the entropy model 320 performs arithmetic coding 324, which includes arithmetic encoding 324a and arithmetic decoding 324b. Instead of replacing each fixed-length input symbol with the corresponding variable-length prefix-free output codeword, as described above, arithmetic encoding 324a encodes an entire series of fixed-length input symbols (e.g., individual channel of the quantized representation data 404) into a single number, an arbitrary-precision fraction q where $0.0 \leq q < 1.0$. This fraction q represents the current information as a range, defined by two numbers, as known to one of skill in the art. Thus, performing arithmetic encoding 324a converts the quantized representation data 404, which represents integer values for the discrete values, to the compressed representation data 405, which represents the arbitrary-precision fraction q using binary numbers.

FIG. 4B includes an arithmetic coding example 424 to conceptually illustrate a simplified example of performing arithmetic coding using four unique symbols (e.g., a-d). As illustrated in FIG. 4B, symbol "a" has a relative frequency of ½, symbol "b" has a relative frequency of ¼, symbol "c" has a relative frequency of ⅛, and symbol "d" has a relative frequency of ⅛, which corresponds to codeword lengths of 1, 2, 3, and 3, respectively. As symbol "a" is the most frequently used symbol, it will be stored with the fewest bits, symbol "b" will be stored with an intermediate number of bits, and symbols "c" and "d" will be stored with the most bits. For example, symbol "a" may be represented using a first codeword (e.g., "0") having a length of one, symbol "b" may be represented using a second codeword (e.g., "10") having a length of two, symbol "c" may be represented using a third codeword (e.g., "110") having a length of three, and symbol "d" may be represented using a fourth codeword (e.g., "111") having a length of three.

To encode a message, arithmetic coding encodes the codewords as points on a number line from 0 to 1 (e.g., unit interval), with the unit interval divided into four subintervals corresponding to the four symbols. For example, symbol "d" corresponds to a first interval on the unit interval of [0, 0.001), indicating that 0 is included in the first interval and that fractions equal to or greater than 0 but less than 0.001 are in the first interval. Similarly, symbol "a" corresponds to a second interval of [0.001, 0.1001), symbol "b" corresponds to a third interval [0.1001, 0.111), and symbol "c" corresponds to a fourth interval [0.111, 1). Thus, the codeword for symbol "a" has ½ the interval, the codeword for symbol "b" has ¼ the interval, and "the codeword for symbols "c" and "d" have ⅛ the interval.

For each of the symbols, the arithmetic encoding 324a may determine a cumulative probability and a symbol probability, as illustrated in the arithmetic coding example 424. Thus, the arithmetic encoding 324a may systematically calculate the next interval from the leftmost point C and width A of a current interval given the probability p and the cumulative probability P for the symbol to be encoded.

To conceptually illustrate encoding a string of characters into a single number using arithmetic encoding 324a, the arithmetic coding example 424 illustrates an example of encoding a string of three characters (e.g., "a a b"). For example, the arithmetic encoding 324a may iteratively encode each symbol to identify a subinterval, with the first "a" having the subinterval [0.011, 0.111), the second "a" having the subinterval [0.1001, 0.1101), and "b" having the subinterval [0.10011, 0.10101).

Similarly, arithmetic decoding 324b may receive a code string generated by the arithmetic encoding 324a and decode it, as the code string indicates what the encoder did. Thus, the arithmetic decoding 324b recursively reverses the encoder's recursion. For example, the arithmetic decoding 324b may iteratively decode symbols by examining the code string to determine an interval in which it lies and decode a symbol corresponding to that interval.

While the arithmetic coding example 424 is included to conceptually illustrate an example of arithmetic coding, arithmetic coding is known to one of skill in the art and therefore a more detailed description of arithmetic coding is omitted.

As illustrated in FIG. 4B, the entropy model 320 may decode the compressed representation data 405 to reconstructed representation data 407. For example, the entropy model 320 may perform arithmetic decoding 324b and inverse quantization 326 to approximate the original range of pixel intensities (e.g., increase the range of pixel values from 16 values to 256+ values) using the fixed number of bits per symbol. Thus, the compressed representation data 405 may be decoded using the arithmetic decoding 324b to generate reconstructed quantized representation data 406 that represents data using the fixed number of bits per symbol, and then inverse quantization 326 may be performed to approximate the original range of values (e.g., convert from the fixed number of uniform bins back to the original range of values) and generate the reconstructed representation data 407. As arithmetic decoding 324b reverses the process described above with regard to arithmetic encoding 324a and inverse quantization 326 reverses the quantization 322 described above, a further description is omitted. However, as quantization is lossy, the reconstructed representation data 407 is only an approximations of the representation data 403.

As illustrated in FIG. 4C, the decoding layers 330 may receive reconstructed representation data 407 and may iteratively process the representation data to generate reconstructed image data 409. For example, FIG. 4C illustrates the decoding layers 330 as three separate layers, a first decoding layer 330a, a second decoding layer 330b, and a third decoding layer 330c. To illustrate the concepts involved in processing the representation data, FIG. 4C includes illustrative examples showing a simplified representation for the second decoding layer 330b. While these illustrative examples apply to each of the decoding layers 330, they are intended for illustrative purposes only and the system 100 may implement each step differently than the illustrative examples shown in FIG. 4C without departing from the disclosure.

As illustrated in FIG. 4C, the inverse GDN activation 332b process may be visualized using inverse GDN activation example 432, in which input data is denormalized using equation [2] described above to generate output data.

As illustrated in FIG. 4C, the upsampling 334b process may be visualized using upsampling example 434, in which input data having first dimensions (e.g., 4×4) is upsampled to generate output data having second dimensions (e.g., 8×8). For example, a single pixel in the input data is used to generate multiple pixels in the output data, such that a single pixel in the input data corresponds to a single square (e.g., 4 pixels) in the output data. Specifically, this can be represented as a first input pixel value for a first pixel having coordinates (1, 1) in the input data generating first output pixel values for pixels included in a first square (e.g., top-left square including pixel coordinates (1, 1), (2, 1), (1, 2), and (2, 2)) in the output data. Similarly, a second input pixel value for a second pixel having coordinates (2, 1) in the input data generates second output pixel values for pixels included in a second square (e.g., including pixel coordinates (3, 1), (4, 1), (3, 2), and (4, 2)) in the output data, and so on.

As described above, the output data may be generated using any technique known to one of skill in the art without departing from the disclosure, including interpolation (e.g., bilinear interpolation, bicubic interpolation, etc.), transposed convolution, unpooling, and/or the like. While the upsampling example 434 illustrates increasing the dimensions by two (e.g., 2× upsampling), the disclosure is not limited thereto and the system 100 may increase the dimensions by four (e.g., 4× upsampling) and/or any other number without departing from the disclosure.

As illustrated in FIG. 4C, the convolution 336b process may be visualized using convolution example 436, in which a 3×3 kernel with equal weights (e.g., value of 1 for each pixel in the kernel) is convolved with input data to generate output data. For example, the convolution example 436 illustrates how an output pixel value for a particular pixel is generated using input pixel values from a 3×3 grid of pixels. Specifically, the convolution example 436 illustrates that a first output pixel value for a first pixel having coordinates (2, 2) (e.g., $2^{nd}$ column from the left and $2^{nd}$ row from the top) is generated using first input pixel values from pixels included in the first three rows and first three columns (e.g., pixels having coordinates (1, 1), (2, 1), (3, 1), (1, 2), (2, 2), (3, 2), (1, 3), (2, 3), and (3, 3)).

While not illustrated in FIG. 4C, the system 100 would apply the kernel to each pixel in the input data, which can be visualized as the kernel sliding down the length of each row. For example, a second output pixel value for a second pixel having coordinates (3, 2) (e.g., $3^{nd}$ column from the left and $2^{nd}$ row from the top) is generated using second input pixel values for pixels included in rows 1-3 and columns 2-4 (e.g., pixels having coordinates (2, 1), (3, 1), (4, 1), (2, 2), (3, 2), (4, 2), (2, 3), (3, 3), and (4, 3)), a third output pixel value for a third pixel having coordinates (4, 2) (e.g., $4^{th}$ column from the left and $2^{nd}$ row from the top) is generated using third input pixel values for pixels included in rows 1-3 and columns 3-5 (e.g., pixels having coordinates (3, 1), (4, 1), (5, 1), (3, 2), (4, 2), (5, 2), (3, 3), (4, 3), and (5, 3)), and so on.

While the convolution example 436 illustrates performing padding convolution (e.g., output data has the same resolution as the input data), the disclosure is not limited thereto and the system 100 may perform convolution using any technique known to one of skill in the art. Similarly, while the convolution example 436 illustrates a 3×3 kernel, the disclosure is not limited thereto and the system 100 may use different kernel sizes (e.g., 5×5, 9×9, etc.) without departing from the disclosure. Finally, while the convolution example 436 illustrates the kernel using equal weighting, the disclosure is not limited thereto and the weighting may vary without departing from the disclosure.

Figure 5:
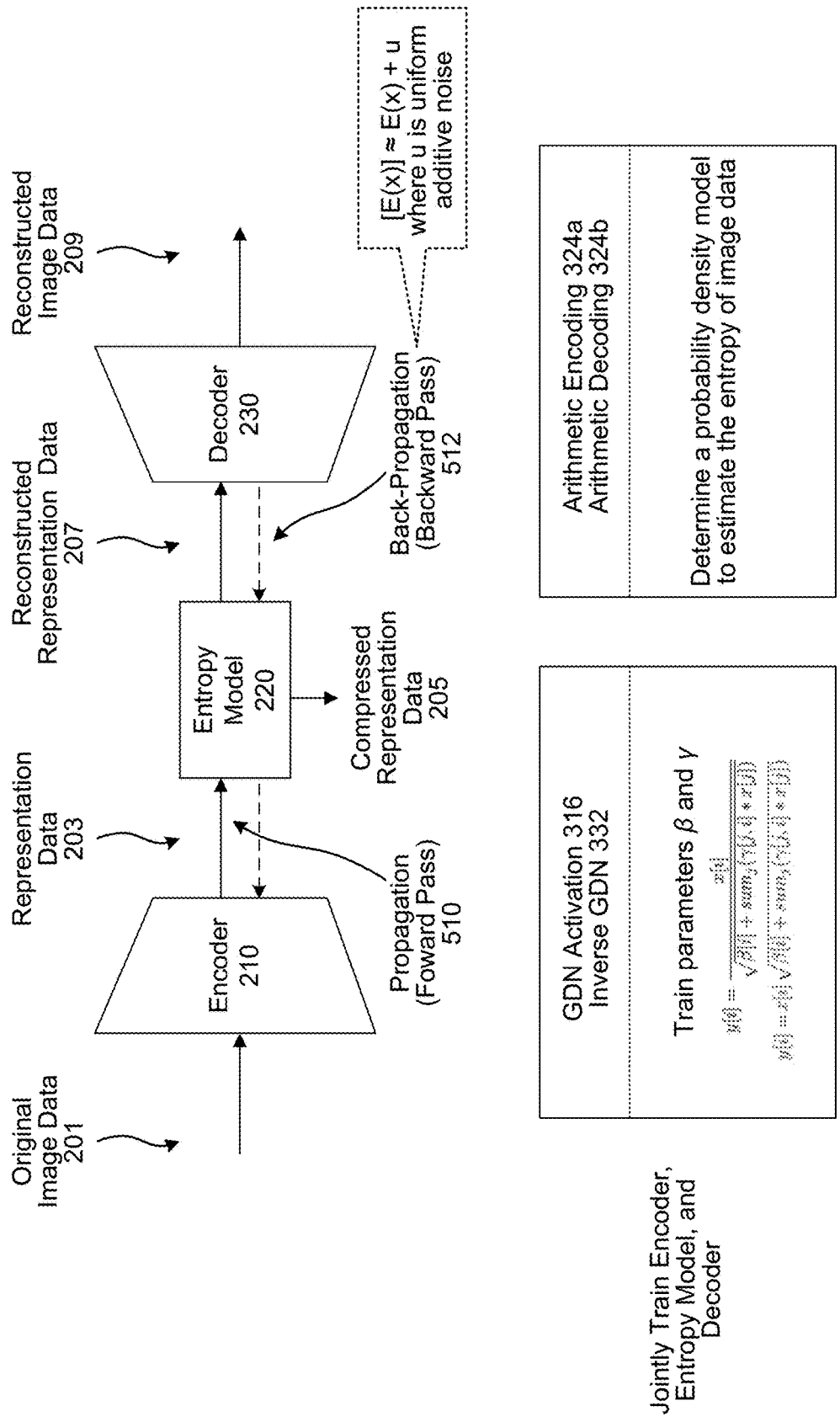
FIG. 5 is a conceptual diagram of training an image compression model according to embodiments of the present disclosure.

FIG. 5 is a conceptual diagram of training an image compression model according to embodiments of the present disclosure. As illustrated in FIG. 5, image compression model training 500 includes the same components described above with regard to FIG. 2. However, in addition to performing propagation (forward pass) 510 from the encoder 210 to the decoder 230, the image compression model training 500 also performs back-propagation (backward pass) 512 from the decoder 230 to the encoder 210. Since the derivative of a function of integers is undefined and this would lead to issues during the back-propagation 512, the image compression model training 500 may include uniform additive noise as a smooth approximation (e.g., $[E(x)] \approx E(x)+u$, where u is uniform additive noise).

Using a loss function, the parameters in all three models are learned and the image compression model is trained to optimize the trade-off between using a small number of bits and having small distortion. So for an input image x, $$\text{loss} = -\log_2 Q([E(x)]) + \lambda * d(x, D([E(x)])) \quad [3]$$

where the first term measures the rate (e.g., number of bits) and the second term measures the distortion of the reconstructed signal. λ is the Lagrange multiplier that controls the rate and distortion trade-off, which may be a hyper-parameter (e.g., λ=1). The square brackets indicate quantization through uniform additive noise, and distortion is measured using a multi-scale structural similarity (MS-SIM or MS-SSIM) metric. Thus, the loss function for the image compression model becomes:

$$\text{loss} = -\log_2 Q([E(x)]) + \lambda * \text{MSSIM}(x, D([E(x)])) \quad [4]$$

As equation (3) cannot be optimized directly using gradient-based techniques (e.g., Q and [.] are non-differentiable), the entropy model 220 may implement a probability density model to estimate the entropy of an image tensor passing through it. The layer trains an independent probability density model for each channel but assumes that across all other dimensions, the inputs are i.i.d. (independent and identically distributed). The entropy model 220 may determine the minimum number of bits per symbol (measured by rate R) that can be communicated over a medium such that the original image data 201 can be approximately reconstructed at the output of the decoder 230 without exceeding a given distortion D. The loss functions for the image compression model is an additive combination of minimizing rate (e.g., the entropy of the probability distribution) and distortion (approximated by the MSSIM metric illustrated in equation (4)).

The system 100 may jointly train the encoder 210, the entropy model 220, and the decoder 230 to determine a probability distribution/probability density model (e.g., histogram of incoming quantized values for each channel), which is used by the entropy model 220 (e.g., arithmetic encoding 324a and arithmetic decoding 324b) to estimate the entropy of image data, and to train parameters β and γ, which are used by the GDN activation 316 and inverse GDN 332 as described in greater detail above with regard to equations (1) and (2).

During training, the system 100 may compare original image data (e.g., input to the encoder) with reconstructed image data (e.g., output from the decoder) to determine an amount of distortion generated as a result of performing image compression. Based on this comparison, the system 100 may learn parameters associated with convolution, upsampling, GDN activation, inverse GDN activation, downsampling, weights between one layer and a subsequent layer, and/or the like. For example, while an amount of downsampling may be fixed, the system 100 may learn parameters corresponding to the downsampling without departing from the disclosure. Thus, the system 100 may learn where to compress data in order to reduce redundancies while still reconstructing the image without exceeding a desired amount of distortion.

Figure 6A:
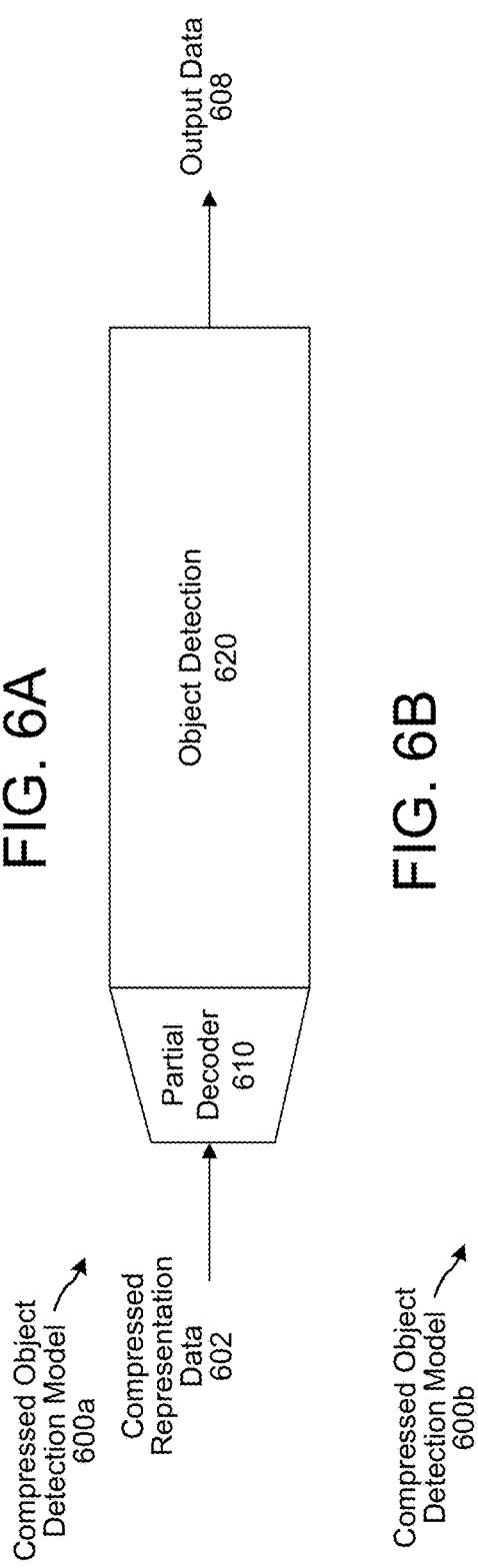
FIGS. 6A-6B are conceptual diagrams illustrating example components of a compressed object detection model according to embodiments of the present disclosure.
Figure 6B:
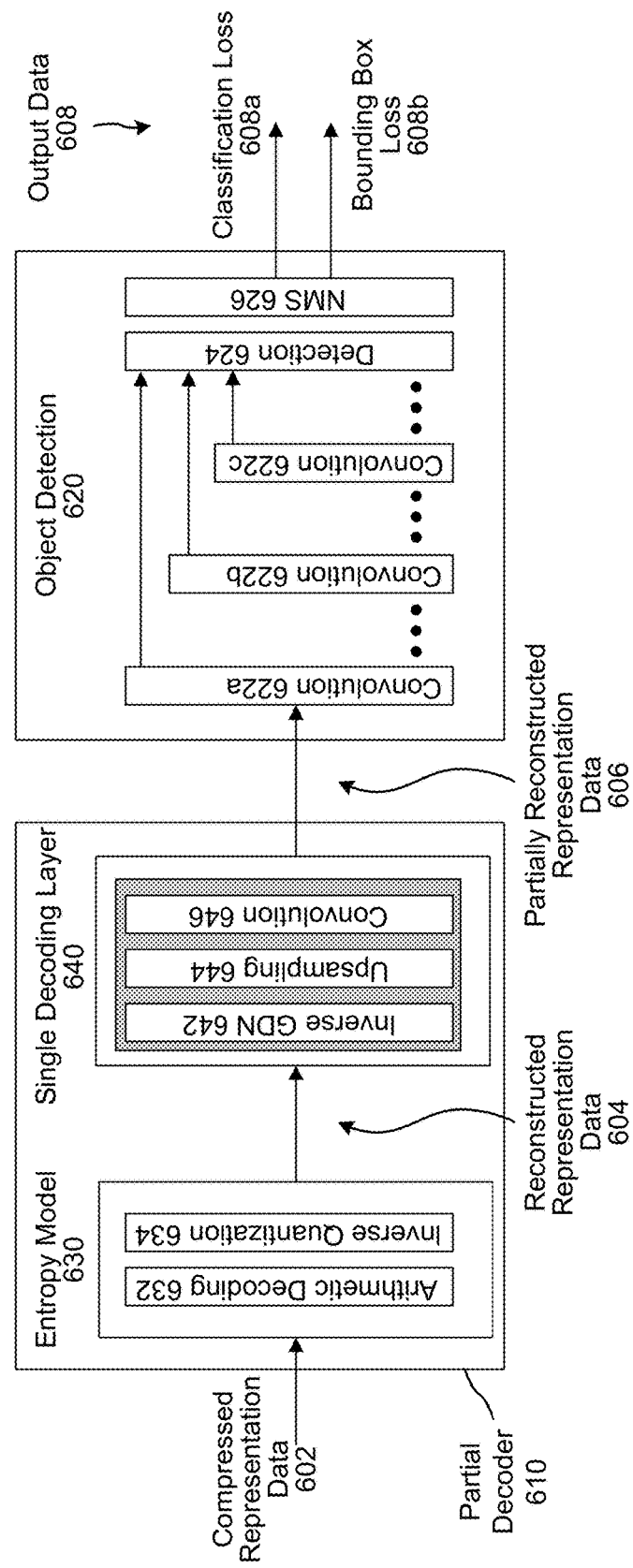

FIGS. 6A-6B are conceptual diagrams illustrating example components of a compressed object detection model according to embodiments of the present disclosure. As illustrated in FIG. 6A, a first compressed object detection model 600a illustrates a simplified example of performing object detection using compressed representation data. For example, the first compressed object detection model 600a may include a partial decoder 610 that receives compressed representation data 602 and performs partial decoding for an object detection component 620, which performs object detection on the partially decoded representation data to generate output data 608.

As illustrated in FIG. 6B, a second compressed object detection model 600b illustrates a detailed example of performing object detection using compressed representation data. For example, the second compressed object detection model 600b may include the partial decoder 610 that receives the compressed representation data 602 and performs partial decoding using an entropy model 630 and a single decoding layer 640. For example, the entropy model 630 may perform arithmetic decoding 632 and inverse quantization 634 on the compressed representation data 602 to generate reconstructed representation data 604, and the single decoding layer 640 may perform inverse GDN 642, upsampling 644, and convolution 646 on the reconstructed representation data 604 to generate partially reconstructed representation data 606 (e.g., intermediate reconstructed representation data).

The object detection component 620 may perform object detection using techniques known to one of skill in the art without departing from the disclosure. For example, the object detection component 620 may receive the partially reconstructed representation data 606 and perform a series of convolutions 622 to perform feature extraction. The features may be input to a detection component 624 and Non-Maximum Suppression (NMS) component 626 to generate output data 608 corresponding to classification loss 608a and/or bounding box loss 608b, although the disclosure is not limited thereto. For example, the output data 608 may indicate a bounding box corresponding to a position of an object represented in image data represented by the partially reconstructed representation data 606, along with an object classification indicating a classification of the object, and/or the like.

In some examples, the system 100 may train the object detection component 620 using test data that includes representation data and first output data (e.g., object classifications and corresponding bounding boxes associated with the representation data) corresponding to the representation data. The test data may be used as a baseline with which to train the object detection component 620. For example, the system 100 may process the representation data using the object detection component 620 to generate second output data and may compare the second output data to the first output data to improve the object detection component 620. However, the disclosure is not limited thereto and the system 100 may train the object detection component 620 using any technique known to one of skill in the art without departing from the disclosure.

Figure 7:
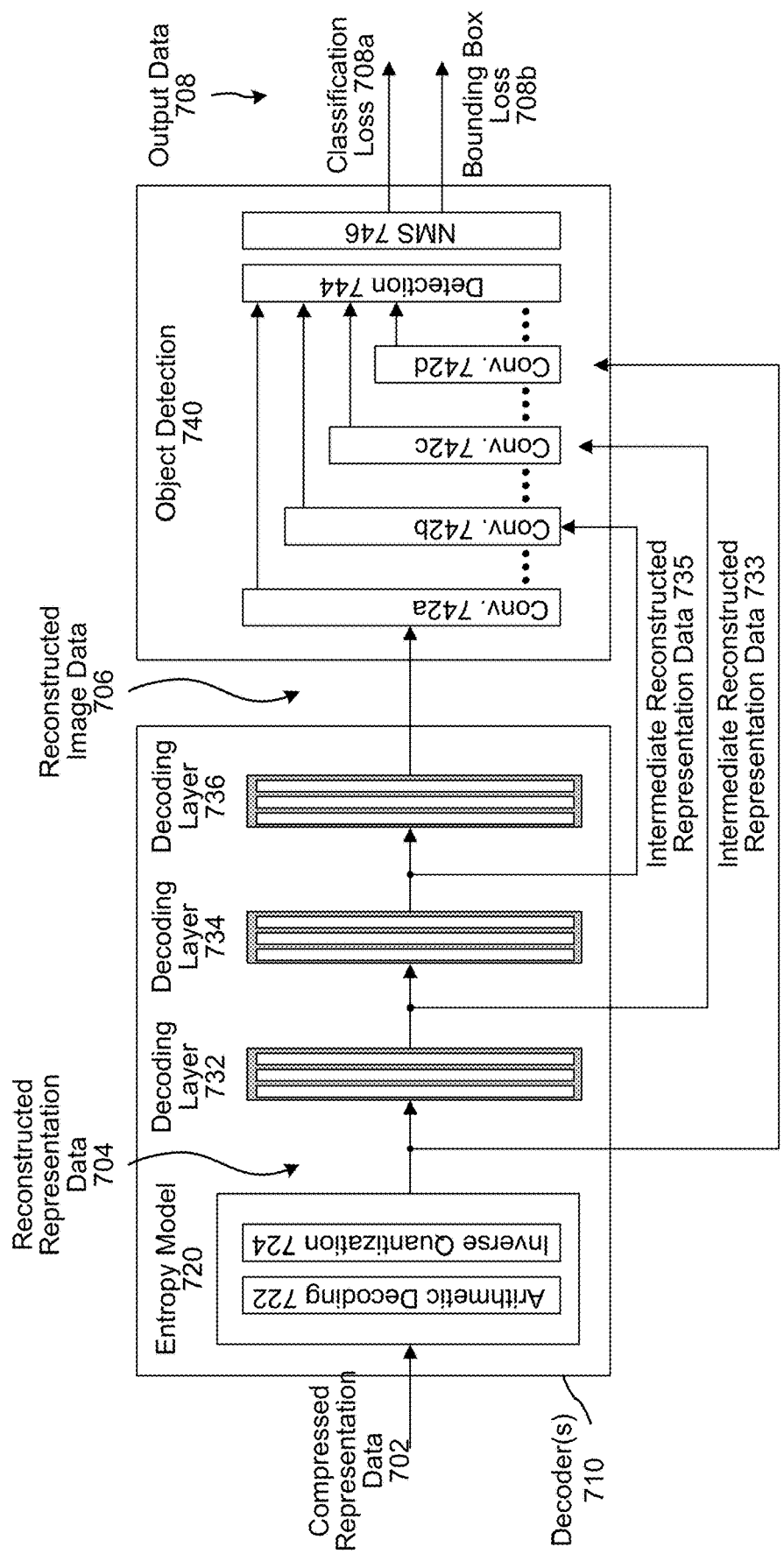
FIG. 7 is a conceptual diagram illustrating multiple implementations of a compressed object detection model according to embodiments of the present disclosure.

FIG. 7 is a conceptual diagram illustrating multiple implementations of a compressed object detection model according to embodiments of the present disclosure. As illustrated in FIG. 7, the compressed object detection model 700 may process reconstructed representation data output by the entropy model 720 and/or each of the decoding layers included in the decoder(s) 710. For example, the decoder(s) 710 may process the compressed representation data 702 as described above with regard to FIGS. 3A-4C to generate reconstructed representation data 704 (e.g., output of the entropy model 720), intermediate reconstructed representation data 733 (e.g., output of the first decoding layer 732), intermediate reconstructed representation data 735 (e.g., output of the second decoding layer 734), and/or reconstructed image data 706 (e.g., output of the third decoding layer 736).

An object detection component 740 may perform object detection on the output of the decoder(s) 710 using techniques known to one of skill in the art without departing from the disclosure. For example, the object detection component 740 may receive the reconstructed image data 706 and perform a series of convolutions using convolution layers 742a-742d to perform feature extraction. The features may be input to a detection component 744 and Non-Maximum Suppression (NMS) component 746 to generate output data 708 corresponding to classification loss 708a and/or bounding box loss 708b, although the disclosure is not limited thereto. For example, the output data 708 may indicate a bounding box corresponding to a position of an object represented in the reconstructed image data 706, along with object classification indicating a classification of the object, and/or the like, although the disclosure is not limited thereto.

In some examples, the decoder(s) 710 may only generate a single output corresponding to a particular implementation (e.g., intermediate reconstructed representation data 733 if implemented using a single decoding layer, intermediate reconstructed representation data 735 if implemented using two decoding layers, etc.), and the object detection component 740 may be configured to process the single output generated by the decoder(s) 710. For example, if the decoder(s) 710 is implemented using three decoding layers to generate the reconstructed image data 706, the object detection component 740 may include each of the convolution layers 742a-742d illustrated in FIG. 7. However, if the decoder(s) 710 is implemented using two decoding layers 732/734 to generate the intermediate reconstructed representation data 735, the object detection component 740 may be configured to only include convolution layers 742b-742d, as the first convolution layer 742a is not necessary due to the spatial dimensions of the intermediate reconstructed representation data 735.

Similarly, if the decoder(s) 710 is implemented using a single decoding layer to generate the intermediate reconstructed representation data 733, the object detection component 740 may be configured to only include convolution layers 742c-742d, as the first two convolution layers 742a-742b are not necessary due to the spatial dimensions of the intermediate reconstructed representation data 733. Finally, if the decoder(s) 710 is implemented without a decoding layer, only generating the reconstructed representation data 704, the object detection component 740 may be configured to only include convolution layer 742d, as the convolution layers 742a-742c are not necessary due to the spatial dimensions of the reconstructed representation data 704. Thus, reducing the number of the decoding layers 732/734/736 included in the decoder(s) 710 reduces a complexity of the object detection component 740 (e.g., reduces a number of convolution layers) and therefore reduces an inference time when performing object detection.

While reducing the number of decoding layers reduces a complexity of both the decoder(s) 710 and the object detection component 740, reducing a processing consumption and increasing a processing speed, this may also reduce a performance of the object detection component 740 due to a decrease in image quality represented by the representation data. For example, the object detection component 740 may exhibit poor performance when processing the reconstructed representation data 704, whereas the object detection component 740 may exhibit much better performance when processing the intermediate reconstructed representation data 733 generated using a single layer of decoding.

FIGS. 8A-8B illustrate comparison charts that show performance improvements associated with the image compression model and the compressed object detection model according to embodiments of the present disclosure. As shown by compression comparison 810 illustrated in FIG. 8A, the image compression models described above with regard to image compression model 110 (e.g., Learned Image Compression (LIC)) generated compressed representation data having a smaller size than competing image compression techniques, such as Joint Photographic Experts Group (JPEG), JPEG 2000 (JPEG2K), and WEBP. For example, the compressed representation data generated by the image compression model 110 (LIC) was 35.9 KB, much smaller than the 65.3 KB compressed image data generated by JPEG, the 54.4 KB compressed image data generated by JPEG2K, or 49.7 KB compressed image data generated by WEBP.

The image compression model 110 is capable of efficiently compressing image data regardless of compression rates. For example, Table 1 illustrates examples of performance values (e.g., similarity metrics, measured using a multi-scale structural similarity (MS-SIM or MS-SSIM) model) and compressed sizes associated with three different image datasets and four different compression rates (e.g., bits-per-pixel (bpp) values).

TABLE 1

|  | MS-SIM @ BPP | | | | | COMPRESSED SIZE @ BPP IN MB | | | |
| --- | --- | --- | --- | --- | --- | --- | --- | --- | --- |
|  | 0.13 | 0.22 | 0.33 | 0.47 | ORIG | 0.13 | 0.22 | 0.22 | 0.47 |
| Dataset 1 | 0.89 | 0.93 | 0.96 | 0.98 | 15.07 | 0.006 | 0.009 | 0.01 | 0.02 |
| Dataset 2 | 0.88 | 0.94 | 0.97 | 0.98 | 6562 | 0.006 | 0.009 | 0.01 | 0.02 |
| Dataset 3 | 0.89 | 0.93 | 0.96 | 0.98 | 6649 | 0.006 | 0.009 | 0.01 | 0.02 |

As illustrated in Table 1, the image compression model 110 is able to compress image data efficiently while still generating reconstructed image data with a high level of similarity relative to the original image data. For example, the MS-SIM index is between 0.96-0.97 for all three datasets at 0.33 bpp and around 0.98 for all three datasets at 0.47 bpp. Despite this high level of similarity, the image compression model 110 compressed the original sizes of the three datasets (e.g., 15 MB for dataset 1, 6562 MB for dataset 2, and 6649 MB for dataset 3) to a compressed size of 0.01 MB at 0.33 bpp and 0.02 MB at 0.47 bpp.

Further, speed comparison 820 illustrated in FIG. 8A illustrates that Learned Image Compression (LIC) also performs image compression in much less time than the competing image compression techniques, such as JPEG, JPEG2K, and WEBP. For example, the image compression model 110 (LIC) had an encode time of 4.3 ms and a decode time of 5.2 ms, in comparison to an encode time of 18.6 ms and a decode time of 13.0 ms for JPEG, an encode time of 367.4 ms and a decode time of 80.4 ms for JPEG2K, and an encode time of 67.0 ms and a decode time of 83.7 ms for WEBP.

As shown by performance comparison 830 illustrated in FIG. 8B, a first compressed object detection model COD1, which is described above with regard to FIG. 6B, has a similar performance to a first object detection model (oSSDC) that performs object detection on raw image data (e.g., decompressed image data) such as COCO2014 val dataset images (Coco). For example, first mean average precision (mAP) values of the first compressed object detection model COD1 (e.g., 25.7, 44.3, 26.1) are slightly better than second mAP values of the first object detection model oSSDC (e.g., 25.1, 43.1, 24.8). However, speed comparison 840 illustrates that the first compressed object detection model COD1 has an inference runtime of only 9.5 ms, representing a 21% improvement over the inference runtime of 12 ms of the first object detection model oSSDC.

Both of these models perform better than a second compressed object detection model COD0 and a second object detection model (oSSDJ). The second compressed object detection model COD0 corresponds to inputting the reconstructed representation data 704 to the object detection component 740, as illustrated in FIG. 7, whereas the second object detection model (oSSDJ) performs object detection on compressed image data (e.g., JPEG) such as compressed COCO2014 val dataset images (JCoco). For example, the second compressed object detection model COD0 had third mAP values (e.g., 18.3, 32.9, 18.0) similar to fourth mAP values (e.g., 19.2, 31.6, 17.5) of the second object detection model (oSSDJ), but an inference runtime for the second compressed object detection model COD0 of 8.1 ms represents an improvement over the 10.1 ms inference runtime of the second object detection model (oSSDJ).

Figure 9A:
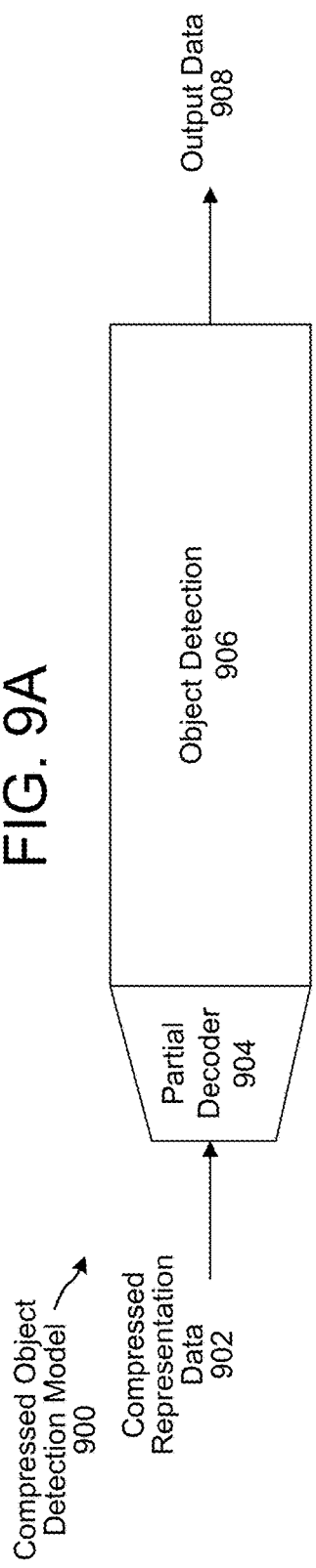
FIGS. 9A-9C illustrate examples of models for performing computer vision according to embodiments of the present disclosure.
Figure 9B:
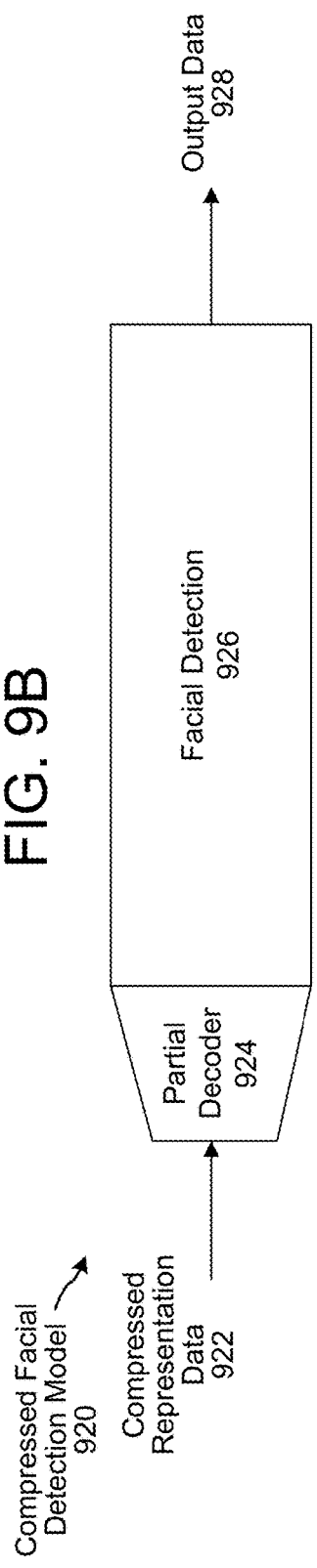
Figure 9C:
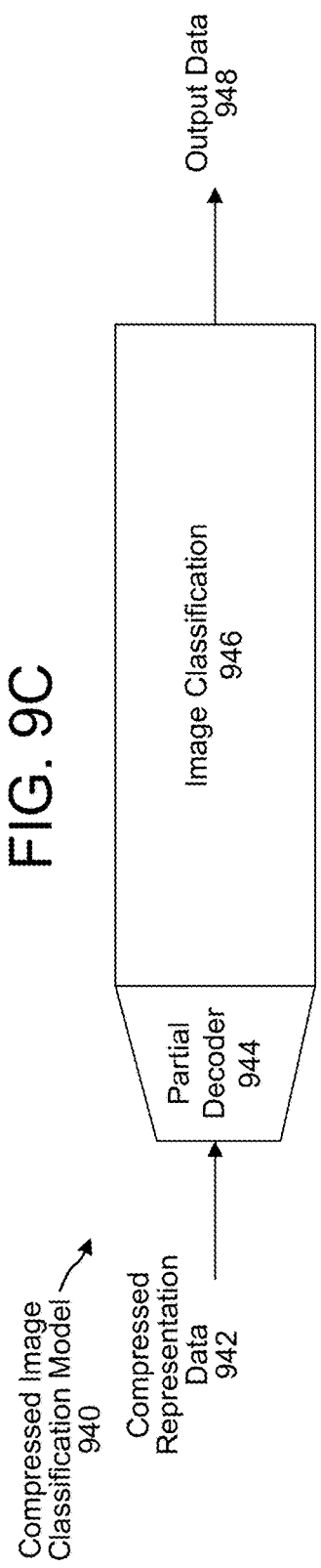

FIGS. 9A-9C illustrate examples of models for performing computer vision according to embodiments of the present disclosure. As used herein, computer vision processing corresponds to analyzing image data using an algorithm, such as performing image classification, object detection, facial recognition, and/or the like. As illustrated in FIG. 9A, the image compression model 110 may be used to perform object detection using a compressed object detection model 900, as described in greater detail above. For example, compressed representation data 902 may be input to a partial decoder 904, which may generate partially decoded representation data (e.g., intermediate reconstructed representation data) to input to an object detection component 906. The object detection component 906 may perform object detection on the partially decoded representation data and generate output data 908, as discussed in greater detail above with regard to FIGS. 6A-7. However, the disclosure is not limited thereto, and the image compression model 110 may be used to perform computer vision using other techniques/algorithms, as illustrated in FIGS. 9B-9C.

As illustrated in FIG. 9B, the image compression model 110 may be used to perform facial detection (e.g., facial recognition or the like) using a compressed facial detection model 920. For example, compressed representation data 922 may be input to a partial decoder 924, which may generate partially decoded representation data (e.g., intermediate reconstructed representation data) to input to a facial detection component 926. The facial detection component 926 may perform facial recognition on the partially decoded representation data and generate output data 928 using any technique known to one of skill in the art. For example, the output data 928 may indicate a bounding box associated with a face represented in the partially decoded representation data, along with an identity associated with the face.

As illustrated in FIG. 9C, the image compression model 110 may also be used to perform image classification using a compressed image classification model 940. For example, compressed representation data 942 may be input to a partial decoder 944, which may generate partially decoded representation data (e.g., intermediate reconstructed representation data) to input to an image classification component 946. The image classification component 946 may perform image classification on the partially decoded representation data and generate output data 948 using any technique known to one of skill in the art. For example, the output data 948 may indicate a category or classification associated with the image represented in the partially decoded representation data.

While FIGS. 9A-9C illustrate examples of performing object detection, facial detection and/or image classification using the image compression model 110, the disclosure is not limited thereto. Instead, the image compression model 110 and/or components of the image compression model 110 (e.g., encoder and entropy model, decoder and entropy model, etc.) may be combined with any image processing techniques known to one of skill in the art, including image segmentation, action recognition, and/or the like, without departing from the disclosure. For example, while specific components may vary based on the image processing technique being performed, the image processing would process intermediate representation data generated using a partial decoder instead of the reconstructed image data generated using the full decoder.

Figure 10A:
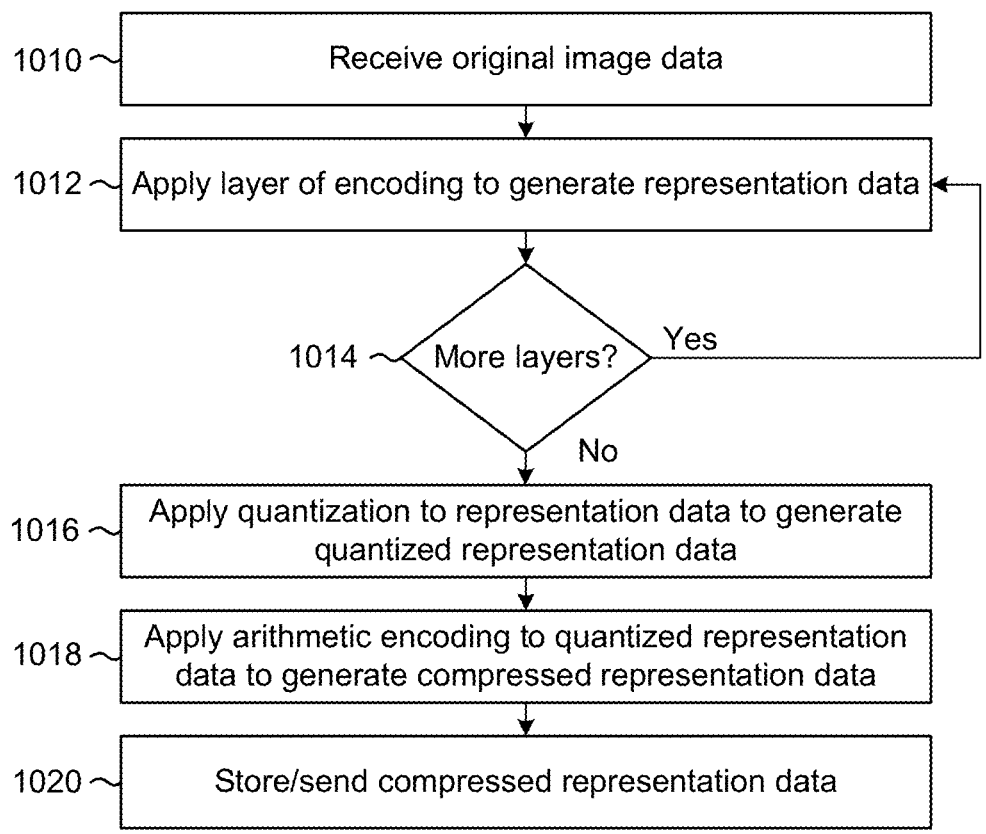
FIGS. 10A-10B are flowcharts conceptually illustrating example methods for encoding using the image compression model according to embodiments of the present disclosure.
Figure 10B:
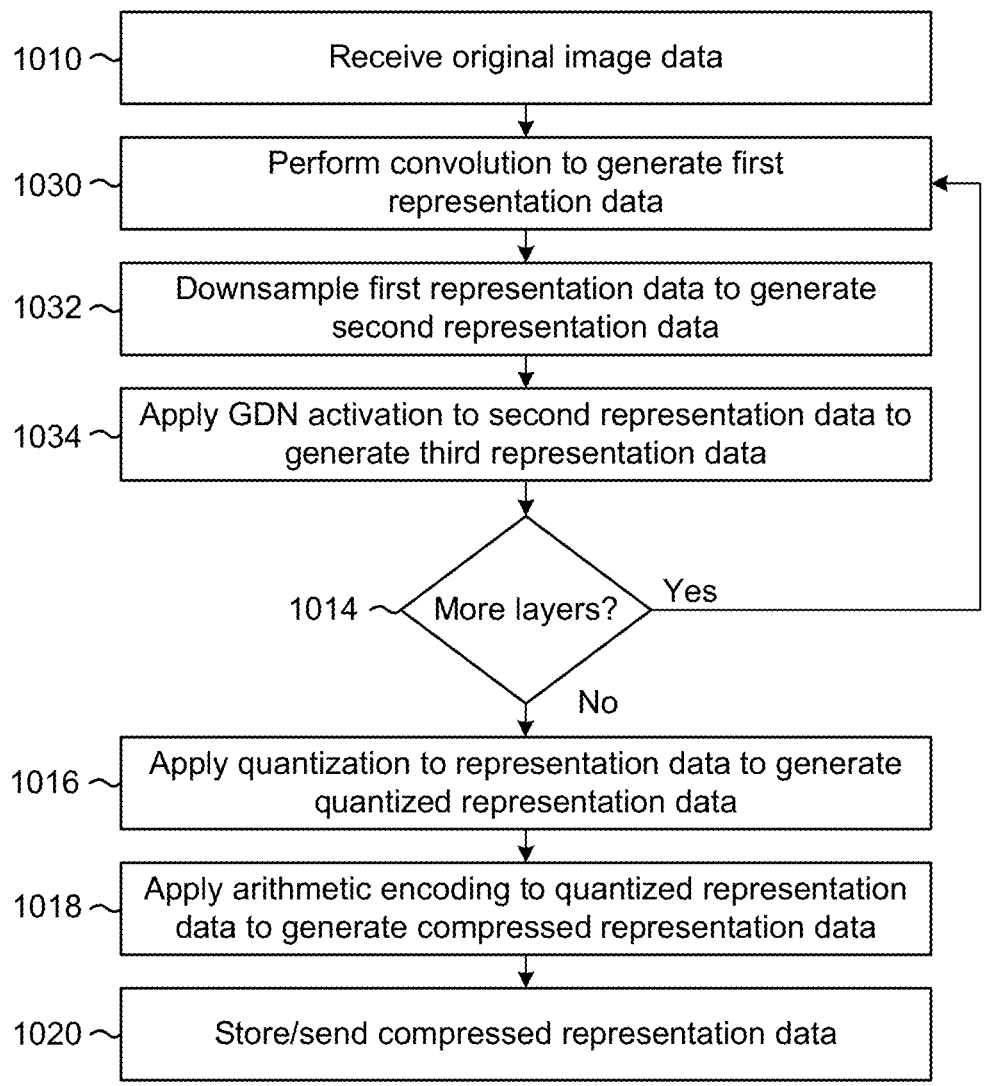

FIGS. 10A-10B are flowcharts conceptually illustrating example methods for encoding using the image compression model according to embodiments of the present disclosure. As illustrated in FIG. 10A, the device 102 may receive (1010) original image data, may apply (1012) a layer of encoding to the original image data to generate representation data, and may determine (1014) if there are additional layers of the encoder. If there are additional layers, the device 102 may loop to step 1012 and repeat step 1012 for each additional layer. If there are no additional layers, the device 102 may apply (1016) quantization to the representation data to generate quantized representation data, may apply (1018) arithmetic encoding to the quantized representation data to generate compressed representation data, and may store/send (1020) the compressed representation data. For example, the device 102 may store the compressed representation data to reduce a size associated with storing the image relative to the original image data. Additionally or alternatively, the device 102 may send the compressed representation data to a remote device without departing from the disclosure.

FIG. 10B illustrates additional details associated with step 1012. As illustrated in FIG. 10B, the device 102 may receive (1010) the original image data, may perform (1030) a convolution to generate first representation data, may downsample (1032) the first representation data to generate second representation data, and may apply (1034) generalized divisive normalization (GDN) activation to the second representation to generate third representation data. The device 102 may determine (1014) if there are additional layers of the encoder, and, if there are additional layers, the device 102 may loop to step 1030 and repeat step 1030-1034 for each additional layer. While each layer of the encoder may correspond to steps 1030/1032/1034 (e.g., convolution, downsampling and applying GDN activation), the individual parameters used for each layer of encoding may vary without departing from the disclosure. If there are no additional layers, the device 102 may apply (1016) quantization to the representation data to generate quantized representation data, may apply (1018) arithmetic encoding to the quantized representation data to generate compressed representation data, and may store/send (1020) the compressed representation data.

Figure 11A:
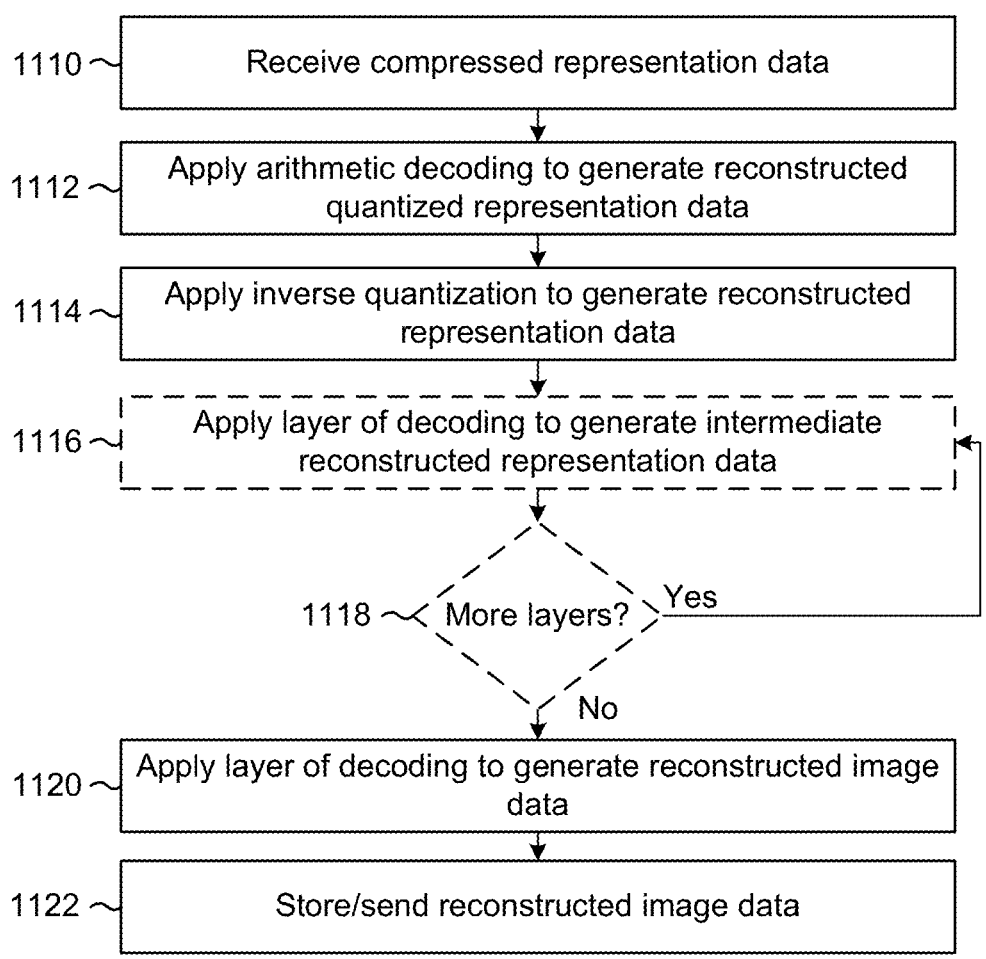
FIGS. 11A-11B are flowcharts conceptually illustrating example methods for decoding using the image compression model according to embodiments of the present disclosure.
Figure 11B:
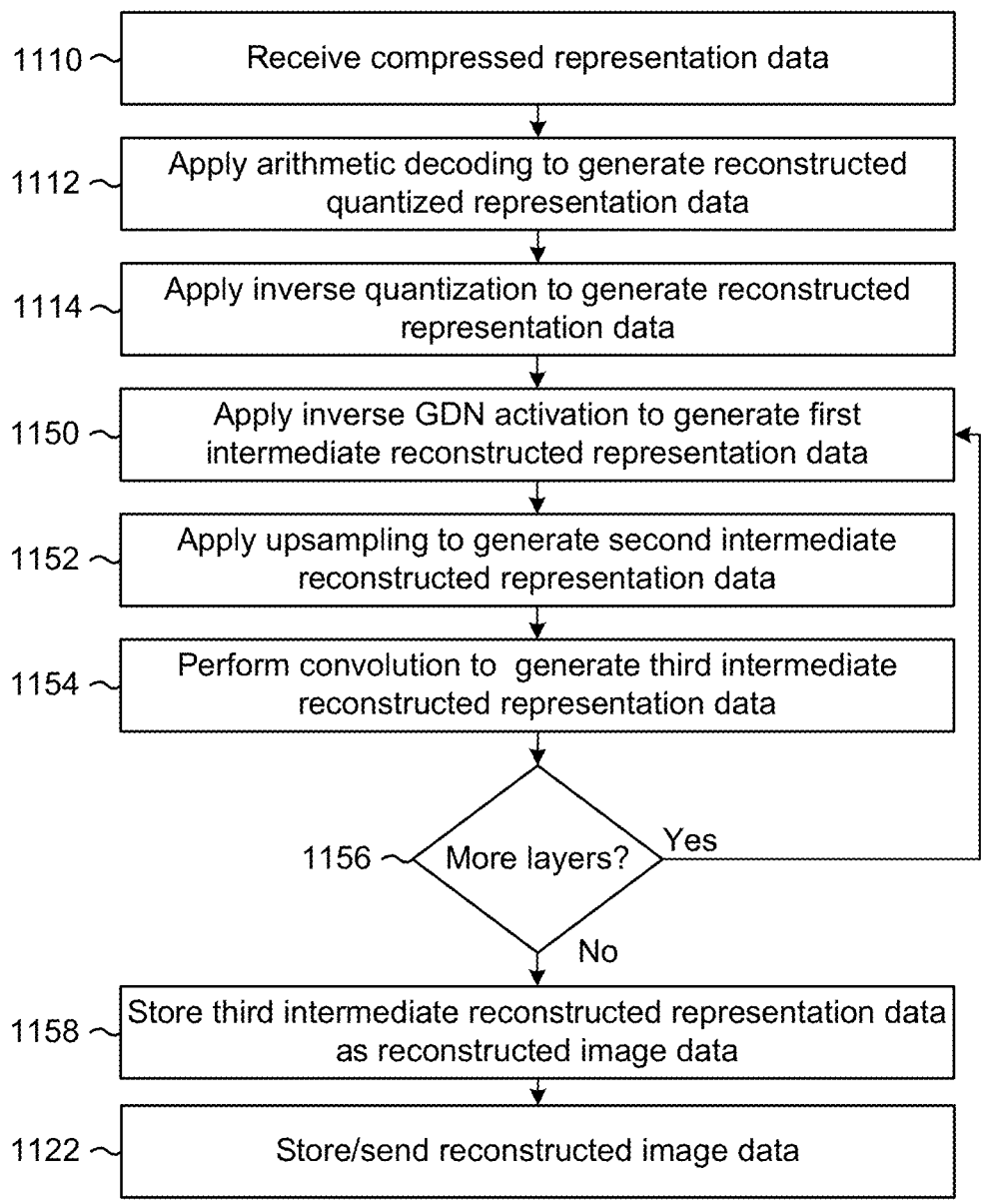

FIGS. 11A-11B are flowcharts conceptually illustrating example methods for decoding using the image compression model according to embodiments of the present disclosure. As illustrated in FIG. 11A, the device 102 may receive (1110) compressed representation data, may apply (1112) arithmetic decoding to generate reconstructed quantized representation data, and may apply (1114) inverse quantization to the reconstructed quantized representation data to generate reconstructed representation data.

The device 102 may optionally apply (1116) a layer of decoding to generate intermediate reconstructed representation data and optionally determine (1118) whether there are additional layers of decoding. If there are additional layers, the device 102 may loop to step 1116 and repeat steps 1116 for each of the additional layers. If there are no additional layers, the device 102 may apply (1120) a layer of decoding to generate reconstructed image data and may store/send (1122) the reconstructed image data. For example, a decoder comprising three layers would repeat step 1116 twice for the first two layers of decoding and then perform step 1120 for the final layer of decoding, although the disclosure is not limited thereto. While each layer of the decoder may be similar, the individual parameters used for each layer of decoding may vary without departing from the disclosure.

FIG. 11B illustrates additional details associated with step 1116/1120. As illustrated in FIG. 11B, the device 102 may receive (1110) compressed representation data, may apply (1112) arithmetic decoding to generate reconstructed quantized representation data, and may apply (1114) inverse quantization to the reconstructed quantized representation data to generate reconstructed representation data.

The device 102 may apply (1150) inverse GDN activation to generate first intermediate reconstructed representation data, may apply (1152) upsampling to generate second intermediate reconstructed representation data, and may perform (1154) a convolution to generate third intermediate reconstructed representation data. The device 102 may determine (1156) if there are additional layers of the decoder, and, if there are additional layers, the device 102 may loop to step 1150 and repeat step 1150-1154 for each additional layer. While each layer of the decoder may correspond to steps 1150/1152/1154 (e.g., applying inverse GDN activation, upsampling and convolution), the individual parameters used for each layer of decoding may vary without departing from the disclosure. If there are no additional layers, the device 102 may store (1158) the third intermediate reconstructed representation data as reconstructed image data and store/send (1122) the reconstructed representation data.

Figure 12A:
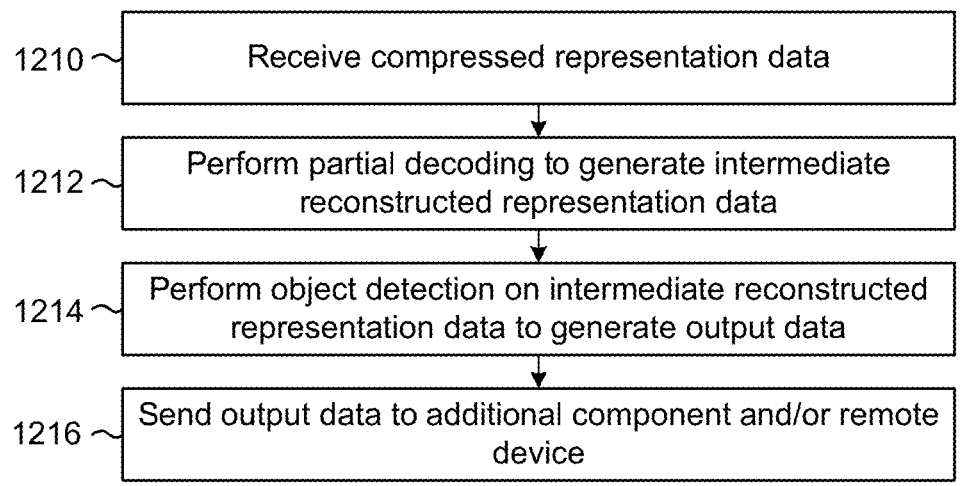
FIGS. 12A-12B are flowcharts conceptually illustrating example methods for performing compressed object detection according to embodiments of the present disclosure.
Figure 12B:
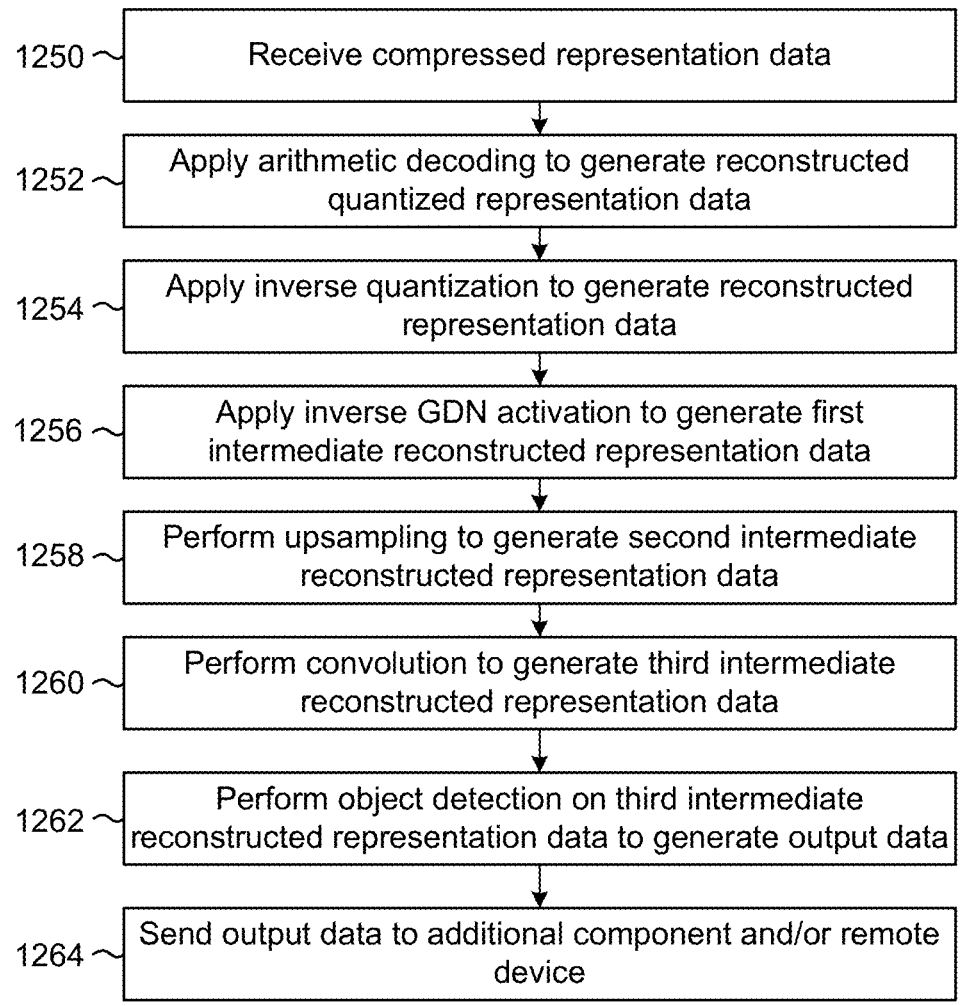

FIGS. 12A-12B are flowcharts conceptually illustrating example methods for performing compressed object detection according to embodiments of the present disclosure. As illustrated in FIG. 12A, the device 102 may receive (1210) compressed representation data, may perform (1212) partial decoding to generate intermediate reconstructed representation data (e.g., partially decoded representation data), may perform (1214) object detection on the intermediate reconstructed representation data to generate output data, and may send (1216) the output data to an additional component and/or to a remote device. For example, the object detection may identify that an object is represented in the intermediate reconstructed representation data and generate output data indicating a bounding box and a classification associated with the object. However, the disclosure is not limited thereto and the device 102 may perform any computer vision processing on the intermediate reconstructed representation data without departing from the disclosure.

As illustrated in FIG. 12B, the device 102 may receive (1250) compressed representation data, may apply (1252) arithmetic decoding to generate reconstructed quantized representation data, and may apply (1154) inverse quantization to the reconstructed quantized representation data to generate reconstructed representation data. The device 102 may then apply (1256) inverse GDN activation to generate first intermediate reconstructed representation data, may apply (1258) upsampling to generate second intermediate reconstructed representation data, and may perform (1260) a convolution to generate third intermediate reconstructed representation data (e.g., partially decoded representation data). The device 102 may perform (1262) object detection on the third intermediate reconstructed representation data to generate output data, and may send (1264) the output data to an additional component and/or to a remote device.

Figure 13:
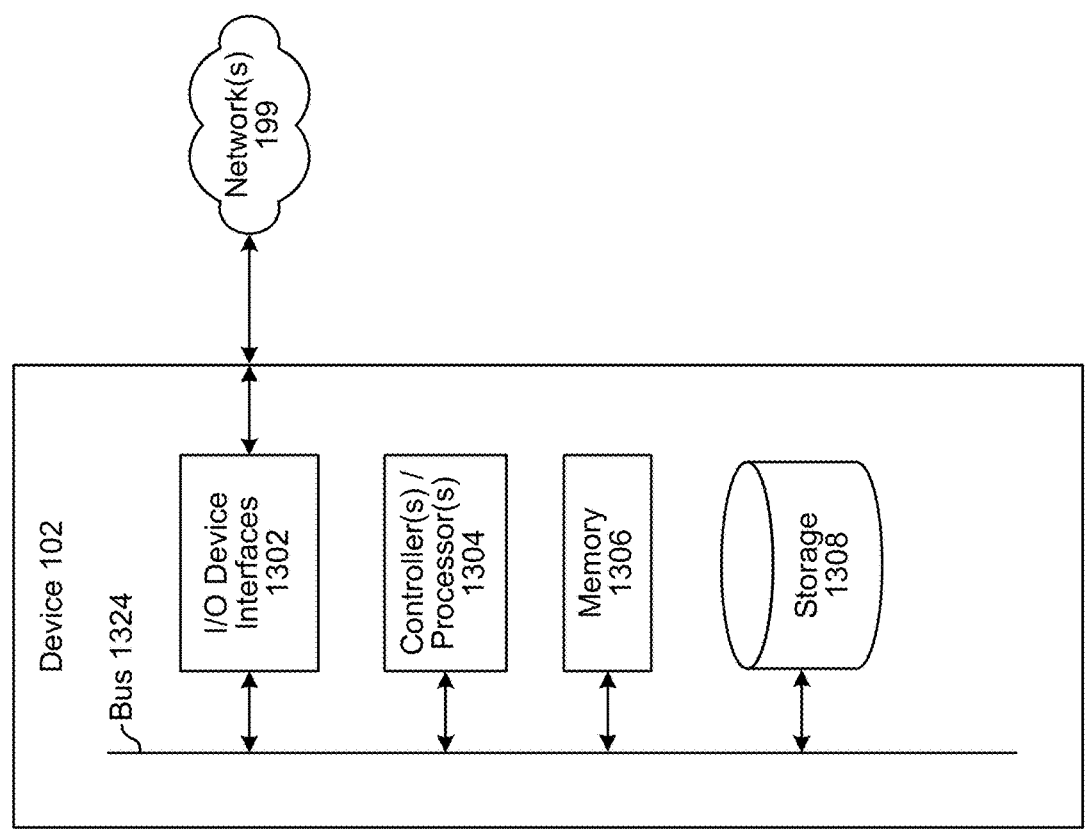
FIG. 13 is a block diagram conceptually illustrating example components of a device according to embodiments of the present disclosure.

FIG. 13 is a block diagram conceptually illustrating example components of a device 102 that may be used with the system 100. The device 102 perform image compression (e.g., encoding compressed representation data), image decoding (e.g., decoding the compressed representation data), compressed object detection, and/or the like without departing from the disclosure. In some examples, a first device 102a may perform image compression using an encoder while a second device 102b may perform image decoding using a decoder. As used herein, the device 102 may correspond to any computing device, including mobile devices, computers, servers, and/or the like.

The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 100, such as one or more servers for performing image encoding, one or more servers for performing image decoding, one or more servers for performing object detection, etc. In operation, each of these server (or groups of devices) may include computer-readable and computer-executable instructions that reside on the respective server, as will be discussed further below.

Each device 102 may include one or more controllers/processors 1304, which may each include a central processing unit (CPU) for processing data and computer-readable instructions, and a memory 1306 for storing data and instructions of the respective device. The memories 1306 may individually include volatile random access memory (RAM), non-volatile read only memory (ROM), non-volatile magnetoresistive memory (MRAM), and/or other types of memory. Each device 102 may also include a data storage component 1308 for storing data and controller/processor-executable instructions. Each data storage component 1308 may individually include one or more non-volatile storage types such as magnetic storage, optical storage, solid-state storage, etc. Each device 102 may also be connected to removable or external non-volatile memory and/or storage (such as a removable memory card, memory key drive, networked storage, etc.) through respective input/output device interfaces 1302.

Computer instructions for operating each device 102 and its various components may be executed by the respective device's controller(s)/processor(s) 1304, using the memory 1306 as temporary "working" storage at runtime. A device's computer instructions may be stored in a non-transitory manner in non-volatile memory 1306, storage 1308, or an external device(s). Alternatively, some or all of the executable instructions may be embedded in hardware or firmware on the respective device in addition to or instead of software.

Each device 102 includes input/output device interfaces 1302. A variety of components may be connected through the input/output device interfaces 1302, as will be discussed further below. Additionally, each device 102 may include an address/data bus (1324) for conveying data among components of the respective device. Each component within a device 102 may also be directly connected to other components in addition to (or instead of) being connected to other components across the bus (1324).

Referring to FIG. 13, the device 102 may include input/output device interfaces 1302 that connect to a variety of components, which may include an image capture device such as a camera (not illustrated) or other component capable of capturing image data.

Via antenna(s) (not illustrated), the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface 1302 may also include communication components that allow data to be exchanged between devices such as different physical systems in a collection of systems or other components.

As noted above, multiple devices may be employed in a single system. In such a multi-device system, each of the devices may include different components for performing different aspects of the system's processing. The multiple devices may include overlapping components. The components of the device 102, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, mobile devices, speech processing systems, and/or distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving compressed representation data having a first number of bits and including a first representation of original image data, the original image data having a first number of channels and a first resolution;

processing, using an entropy model, the compressed representation data to generate first representation data having a second number of bits that is higher than the first number of bits, the first representation data including a second representation of the original image data;
processing, using a first layer of a decoder, the first representation data to generate second representation data comprising partially decoded representation data corresponding to the compressed representation data, the second representation data including a third representation of the original image data and having a second number of channels that is higher than the first number of channels, wherein the processing further comprises:
performing inverse normalization to the first representation data to generate third representation data having a second resolution,
performing upsampling to the third representation data to generate fourth representation data, the fourth representation data having a third resolution that is larger than the second resolution, and
performing a convolution between the fourth representation data and a first kernel to generate the second representation data; and
performing, using a first model, object detection processing on the second representation data to generate output data, the output data indicating a bounding box corresponding to an object represented in the original image data along with an object classification corresponding to the object, wherein the first model is configured to process data having the second number of channels.

2. The computer-implemented method of claim 1, further comprising:
processing, using a second layer of the decoder, the second representation data to generate fifth representation data, the fifth representation data including a fourth representation of the original image data and having the second number of channels; and
processing, using a third layer of the decoder, the fifth representation data to generate reconstructed image data corresponding to the original image data, the reconstructed image data having the first number of channels and the first resolution.

3. The computer-implemented method of claim 1, further comprising:
receiving the original image data having a third number of bits that is higher than the second number of bits;
processing, using one or more layers of an encoder, the original image data to generate fifth representation data having a fourth number of bits that is lower than the third number of bits, the fifth representation data including a fourth representation of the original image data; and
processing, using the entropy model, the fifth representation data to generate the compressed representation data having the first number of bits.

4. The computer-implemented method of claim 1, further comprising, prior to receiving the compressed representation data:
receiving a plurality of training image data;
processing, using an encoder and the entropy model, the plurality of training image data to generate a plurality of compressed representation data, wherein the entropy model generates the plurality of compressed representation data using first symbols that correspond to a first number of discrete values and that have a variable number of bits per symbol determined using a probability distribution associated with the first number of discrete values;

processing, using the entropy model and the decoder, the plurality of compressed representation data to generate a plurality of reconstructed image data; and
training an image compression model by determining the probability distribution using the plurality of compressed representation data, wherein the image compression model includes the encoder, the entropy model, and the decoder.

5. A computer-implemented method, the method comprising:
receiving first data having a first number of bits and including a first representation of first image data, the first image data having a first number of channels;
processing, using an entropy model, the first data to generate second data having a second number of bits that is higher than the first number of bits, the second data including a second representation of the first image data;
processing, using one or more layers of a decoder, the second data to generate third data comprising partially decoded representation data corresponding to the first data, the third data including a third representation of the first image data and having a second number of channels that is higher than the first number of channels; and
performing, using a first model, computer vision processing on the third data to generate output data, wherein the first model is configured to process data having the second number of channels.

6. The computer-implemented method of claim 5, wherein performing the computer vision processing further comprises:
performing object detection on the third data to generate the output data, wherein the output data indicates an object classification and a bounding box corresponding to the object classification.

7. The computer-implemented method of claim 5, wherein performing the computer vision processing further comprises:
performing facial recognition on the third data to generate the output data, wherein the output data indicates a bounding box corresponding to a face and an identity associated with the face.

8. The computer-implemented method of claim 5, wherein processing the second data to generate the third data further comprises:
performing inverse normalization to the second data to generate fourth data;
performing upsampling to the fourth data to generate fifth data; and
performing a convolution to the fifth data to generate the third data.

9. The computer-implemented method of claim 5, further comprising:
processing, using a first layer of the decoder, the third data to generate fourth data, the fourth data including a fourth representation of the first image data and having the second number of channels; and
processing, using a second layer of the decoder, the fourth data to generate second image data, the second image data corresponding to the first image data and having the first number of channels.

10. The computer-implemented method of claim 5, further comprising:
receiving the first image data having the first number of channels and a third number of bits that is higher than the second number of bits;

processing, using one or more layers of an encoder, the first image data to generate fourth data having a fourth number of bits that is lower than the third number of bits, the fourth data including a fourth representation of the first image data; and processing, using the entropy model, the fourth data to generate the first data having the first number of bits.

11. The computer-implemented method of claim 5, prior to receiving the first data:
receiving a first plurality of image data;
processing, using an encoder and the entropy model, the first plurality of image data to generate a first plurality of representation data, wherein the entropy model generates the first plurality of representation data using first symbols that correspond to a first number of discrete values and that have a variable number of bits per symbol determined using a probability distribution associated with the first number of discrete values;
processing, using the entropy model and the decoder, the first plurality of representation data to generate a second plurality of image data; and
training an image compression model by determining the probability distribution using the first plurality of representation data, wherein the image compression model includes the encoder, the entropy model, and the decoder.

12. The computer-implemented method of claim 5, prior to receiving the first data:
receiving a plurality of representation data, the plurality of representation data including compressed tensors corresponding to the second number of channels;
receiving a plurality of test data corresponding to the plurality of representation data, the plurality of test data indicating a bounding box corresponding to a first object and a classification corresponding to the first object;
processing, using the first model, the plurality of representation data to generate a plurality of output data; and
training the first model using the plurality of test data and the plurality of output data.

13. The computer-implemented method of claim 5, wherein processing the first data to generate the second data further comprises:
performing entropy decoding on the first data to generate fourth data, wherein performing the entropy decoding processes the first data using first symbols that correspond to a first number of discrete values and that have a variable number of bits per symbol determined using a probability distribution associated with the first number of discrete values, the fourth data representing the first number of discrete values using second symbols having a fixed number of bits per symbol; and
performing inverse quantization on the fourth data to generate the second data, wherein performing the inverse quantization replaces the first number of discrete values associated with the fourth data with continuous values associated with the second data.

14. A system comprising:
at least one processor; and
memory including instructions operable to be executed by the at least one processor to cause the system to:
receive first data having a first number of bits and including a first representation of first image data, the first image data having a first number of channels;
process, using an entropy model, the first data to generate second data having a second number of bits that is higher than the first number of bits, the second data including a second representation of the first image data;
process, using one or more layers of a decoder, the second data to generate third data comprising partially decoded representation data corresponding to the first data, the third data including a third representation of the first image data and having a second number of channels that is higher than the first number of channels; and
perform, using a first model, computer vision processing on the third data to generate output data, wherein the first model is configured to process data having the second number of channels.

15. The system of claim 14, wherein the memory further comprises instructions that, when executed by the at least one processor, further cause the system to:
perform object detection on the third data to generate the output data, wherein the output data indicates an object classification and a bounding box corresponding to the object classification.

16. The system of claim 14, wherein the memory further comprises instructions that, when executed by the at least one processor, further cause the system to:
perform inverse normalization to the second data to generate fourth data;
perform upsampling to the fourth data to generate fifth data; and
perform a convolution to the fifth data to generate the third data.

17. The system of claim 14, wherein the memory further comprises instructions that, when executed by the at least one processor, further cause the system to:
process, using a first layer of the decoder, the third data to generate fourth data, the fourth data including a fourth representation of the first image data and having the second number of channels; and
process, using a second layer of the decoder, the fourth data to generate second image data, the second image data corresponding to the first image data and having the first number of channels.

18. The system of claim 14, wherein the memory further comprises instructions that, when executed by the at least one processor, further cause the system to:
receive the first image data having the first number of channels and a third number of bits that is higher than the second number of bits;
process, using one or more layers of an encoder, the first image data to generate fourth data having a fourth number of bits that is lower than the third number of bits, the fourth data including a fourth representation of the first image data; and
process, using the entropy model, the fourth data to generate the first data having the first number of bits.

19. The system of claim 14, wherein the memory further comprises instructions that, when executed by the at least one processor, further cause the system to, prior to receiving the first data:
receive a first plurality of image data;
process, using an encoder and the entropy model, the first plurality of image data to generate a first plurality of representation data, wherein the entropy model generates the first plurality of representation data using first symbols that correspond to a first number of discrete values and that have a variable number of bits per symbol determined using a probability distribution associated with the first number of discrete values;

process, using the entropy model and the decoder, the first plurality of representation data to generate a second plurality of image data; and train an image compression model by determining the probability distribution using the first plurality of representation data, wherein the image compression model includes the encoder, the entropy model, and the decoder.

20. The system of claim 14, wherein the memory further comprises instructions that, when executed by the at least one processor, further cause the system to, prior to receiving the first data:

receive a plurality of representation data, the plurality of representation data including compressed tensors corresponding to the second number of channels;

receive a plurality of test data corresponding to the plurality of representation data, the plurality of test data indicating a bounding box corresponding to a first object and a classification corresponding to the first object;

process, using the first model, the plurality of representation data to generate a plurality of output data; and train the first model using the plurality of test data and the plurality of output data.

* * * * *